(12) United States Patent
Fukazawa et al.

(10) Patent No.: US 10,650,601 B2
(45) Date of Patent: May 12, 2020

(54) INFORMATION PROCESSING DEVICE AND INFORMATION PROCESSING METHOD

(71) Applicant: SONY CORPORATION, Tokyo (JP)

(72) Inventors: Ryo Fukazawa, Kanagawa (JP); Kuniaki Torii, Kanagawa (JP); Takahiro Okayama, Tokyo (JP); Kazuomi Kondo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/086,785

(22) PCT Filed: Feb. 17, 2017

(86) PCT No.: PCT/JP2017/006009
§ 371 (c)(1),
(2) Date: Sep. 20, 2018

(87) PCT Pub. No.: WO2017/169272
PCT Pub. Date: Oct. 5, 2017

(65) Prior Publication Data
US 2019/0088020 A1   Mar. 21, 2019

(30) Foreign Application Priority Data
Mar. 29, 2016 (JP) .................................. 2016-066632

(51) Int. Cl.
*G06T 19/00* (2011.01)
*G06T 19/20* (2011.01)
(Continued)

(52) U.S. Cl.
CPC ........ *G06T 19/006* (2013.01); *G02B 27/0172* (2013.01); *G02B 27/0179* (2013.01);
(Continued)

(58) Field of Classification Search
None
See application file for complete search history.

(56) References Cited

U.S. PATENT DOCUMENTS 6,361,438 B1 * 3/2002 Morihira ................. A63F 13/10
463/31
2002/0044152 A1   4/2002 Abott, III et al.
(Continued)

FOREIGN PATENT DOCUMENTS

AU   1169802 A   4/2002
CN   1985277 A   6/2007
(Continued)

OTHER PUBLICATIONS

International Search Report and Written Opinion of PCT Application No. PCT/JP2017/006009, dated May 9, 2017, 09 pages of ISRWO.

(Continued)

*Primary Examiner* — Martin Mushambo
(74) *Attorney, Agent, or Firm* — Chip Law Group

(57) ABSTRACT

An information processing device includes a display control unit that performs display control such that a first virtual object corresponding to content is contained in a rendering image of the content when a position of the content defined in a virtual space and a position of a viewpoint defined in the virtual space have a first positional relation, and a second virtual object corresponding to the content is contained in the rendering image when the position of the content and the position of the viewpoint have a second positional relation. A distance between the position of the content and the position of the viewpoint in the second positional relation is shorter than a distance between the position of the content and the position of the viewpoint in the first positional (Continued)

relation, and visibility of the second virtual object is lower than visibility of the first virtual object.

20 Claims, 15 Drawing Sheets

(51) Int. Cl.
*G02B 27/01* (2006.01)
*G06T 15/20* (2011.01)
*G06T 7/593* (2017.01)
*G06F 3/01* (2006.01)
*G06K 9/00* (2006.01)

(52) U.S. Cl.
CPC .............. *G06T 15/20* (2013.01); *G06T 19/20* (2013.01); *G02B 2027/014* (2013.01); *G02B 2027/0138* (2013.01); *G02B 2027/0178* (2013.01); *G06F 3/013* (2013.01); *G06K 9/00671* (2013.01); *G06T 7/593* (2017.01); *G06T 2207/30204* (2013.01); *G06T 2219/2012* (2013.01); *G06T 2219/2024* (2013.01)

(56) References Cited

U.S. PATENT DOCUMENTS

| 2005/0073531 A1* | 4/2005 | Kuroki | G06T 19/006 345/633 |
|---|---|---|---|
| 2008/0192043 A1 | 8/2008 | Fujii | |
| 2013/0257908 A1 | 10/2013 | Ota et al. | |
| 2015/0052479 A1 | 2/2015 | Ooi et al. | |
| 2016/0033770 A1 | 2/2016 | Fujimaki et al. | |

FOREIGN PATENT DOCUMENTS

| CN | 103370732 A | 10/2013 |
|---|---|---|
| CN | 103377487 A | 10/2013 |
| CN | 203276350 U | 11/2013 |
| CN | 104076513 A | 10/2014 |
| DE | 69810542 T2 | 11/2003 |
| EP | 0893149 A2 | 1/1999 |
| EP | 1758061 A1 | 2/2007 |
| EP | 2836899 A2 | 2/2015 |
| HK | 1017284 A1 | 8/2003 |
| JP | 11-42370 A | 2/1992 |
| JP | 11-042370 A | 2/1999 |
| JP | 3372832 B2 | 2/2003 |
| JP | 2005-108108 A | 4/2005 |
| JP | 2005-108108 A | 5/2005 |
| JP | 2005-322108 A | 11/2005 |
| JP | 3949674 B2 | 7/2007 |
| JP | 2012-174116 A | 9/2012 |
| JP | 2013218597 A | 10/2013 |
| JP | 2014-106681 A | 6/2014 |
| JP | 2015-084150 A | 4/2015 |
| JP | 5056178 B2 | 1/2017 |
| KR | 10-2006-0135947 A | 12/2006 |
| TW | I300200 B | 8/2008 |
| TW | 201403443 A | 1/2014 |
| WO | 01/033688 A2 | 4/2002 |
| WO | 2005/109345 A1 | 11/2005 |
| WO | 2012/114639 A1 | 8/2012 |
| WO | 2013/153740 A2 | 10/2013 |
| WO | 2014/156033 A1 | 10/2014 |

OTHER PUBLICATIONS

Extended European Search Report of EP Application No. 17773820.0, dated Feb. 25, 2019, 8 pages of EESR.

\* cited by examiner

FIG. 3
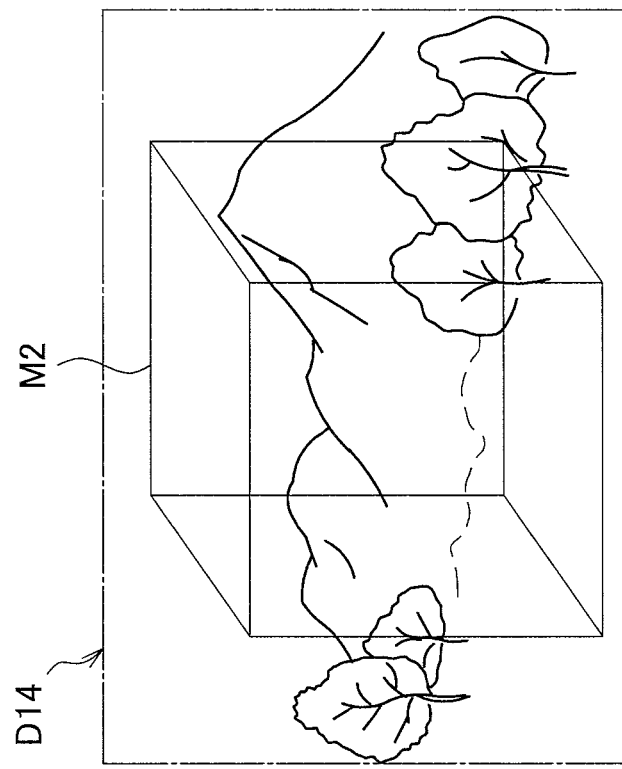
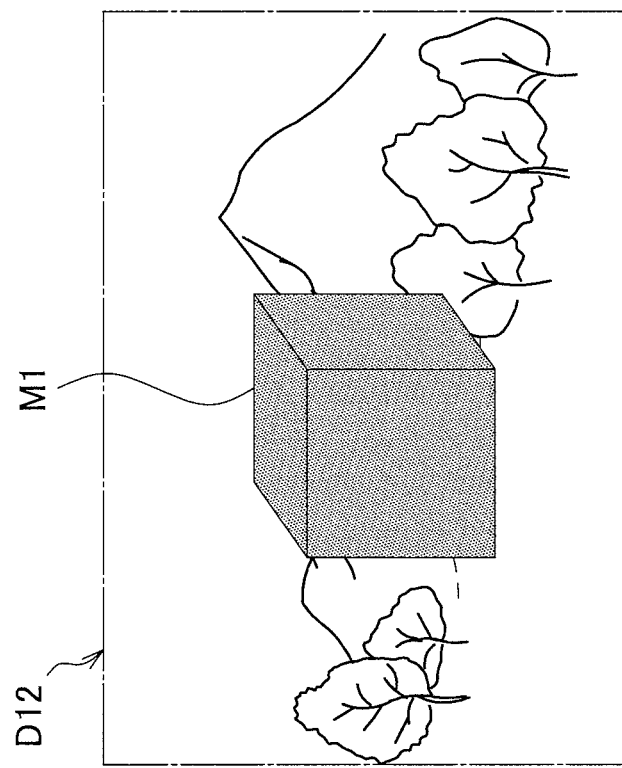

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/006009 filed on Feb. 17, 2017, which claims priority benefit of Japanese Patent Application No. JP 2016-066632 filed in the Japan Patent Office on Mar. 29, 2016. Each of the above-referenced applications is hereby incorporated herein by reference in its entirety.

TECHNICAL FIELD

The present disclosure relates to an information processing device, an information processing method, and a program.

BACKGROUND ART

There are technologies for superimposing objects on backgrounds (real spaces or virtual spaces) to present the objects to users. For example, Patent Literature 1 discloses a technology for displaying an object based on an image of a real space superimposed on an image of a real space on a non-transmissive display or displaying an object superimposed on a background of a real space on a transmissive (see-through) display.

CITATION LIST

Patent Literature

Patent Literature 1: JP 2014-106681A

DISCLOSURE OF INVENTION

Technical Problem

In the foregoing technology, a display size of a display object (an object to be displayed) corresponding to content is changed depending on a positional relation between a position of the content and a position of a viewpoint for generating a rendering image of the content. However, most of an angle of view of a user may be occupied by the display object depending on the positional relation in some cases. Therefore, there is concern that a user may not be able to view the background sufficiently.

Accordingly, the present disclosure proposes a novel and improved information processing device, a novel and improved information processing method, and a novel and improved program capable of preventing occurrence of a situation in which it is difficult for a user to view a background.

Solution to Problem

According to the present disclosure, there is provided an information processing device including: a display control unit configured to perform display control such that a first virtual object corresponding to content is contained in a rendering image of the content to be displayed in a case in which a position of the content defined in a virtual space and a position of a viewpoint defined in the virtual space to generate the rendering image are determined to have a first positional relation, and a second virtual object corresponding to the content is contained in the rendering image to be displayed in a case in which the position of the content and the position of the viewpoint are determined to have a second positional relation. A distance between the position of the content and the position of the viewpoint in the second positional relation is shorter than a distance between the position of the content and the position of the viewpoint in the first positional relation, and visibility of the second virtual object is lower than visibility of the first virtual object.

In addition, there is provided an information processing method including: performing, by an information processing device, display control such that a first virtual object corresponding to content is contained in a rendering image of the content to be displayed in a case in which a position of the content defined in a virtual space and a position of a viewpoint defined in the virtual space to generate the rendering image are determined to have a first positional relation, and a second virtual object corresponding to the content is contained in the rendering image to be displayed in a case in which the position of the content and the position of the viewpoint are determined to have a second positional relation. A distance between the position of the content and the position of the viewpoint in the second positional relation is shorter than a distance between the position of the content and the position of the viewpoint in the first positional relation, and visibility of the second virtual object is lower than visibility of the first virtual object.

In addition, according to the present disclosure, there is provided a program causing a computer system to realize a display control function of performing display control such that a first virtual object corresponding to content is contained in a rendering image of the content to be displayed in a case in which a position of the content defined in a virtual space and a position of a viewpoint defined in the virtual space to generate the rendering image are determined to have a first positional relation, a second virtual object corresponding to the content is contained in the rendering image to be displayed in a case in which the position of the content and the position of the viewpoint are determined to have a second positional relation, a distance between the position of the content and the position of the viewpoint in the second positional relation is shorter than a distance between the position of the content and the position of the viewpoint in the first positional relation, and visibility of the second virtual object is lower than visibility of the first virtual object.

Advantageous Effects of Invention

According to the present disclosure described above, it is possible to prevent occurrence of a situation in which it is difficult for a user to view a background.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is an explanatory diagram illustrating an example in which a display object is specified on the basis of a display size by a display control unit according to the embodiment.

MODE(S) FOR CARRYING OUT THE INVENTION

Figure 1:
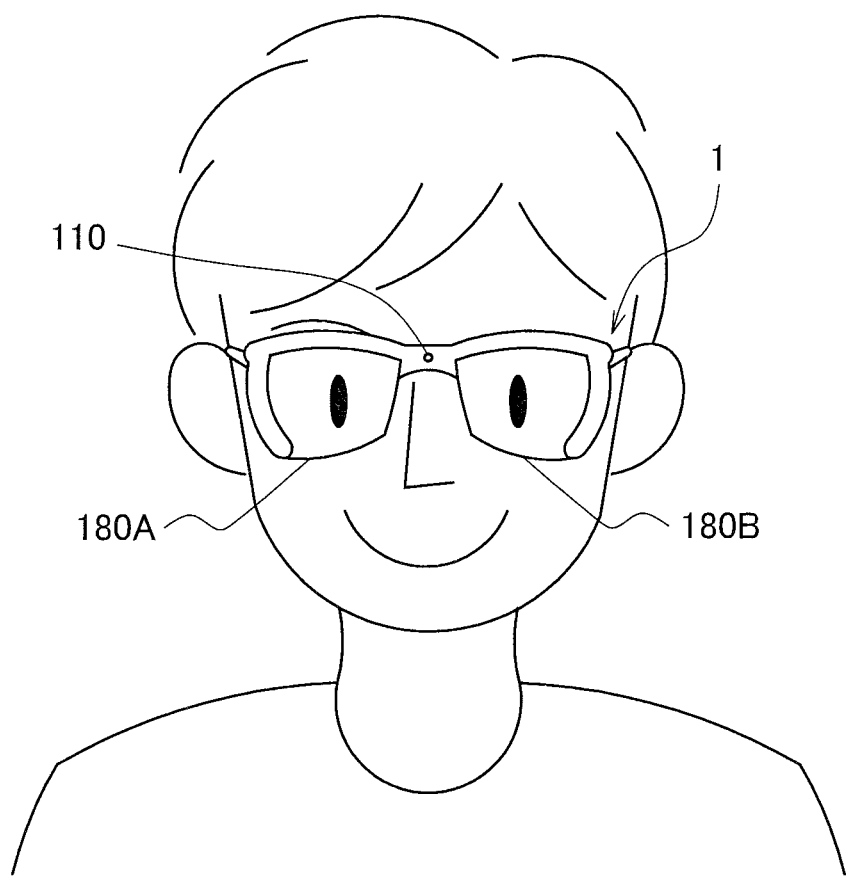
FIG. 1 is an explanatory diagram illustrating the outer appearance of an information processing device according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Note that the description will be made in the following order.
<<1. First embodiment>>
<1-1. Overview of first embodiment>
<1-2. Configuration of first embodiment>
<1-3. Operation of first embodiment>
<1-4. Advantageous effects of first embodiment>
<<2. Second embodiment>>
<2-1. Overview of second embodiment>
<2-2. Configuration of second embodiment>
<2-3. Operation of second embodiment>
<2-4. Advantageous effects of second embodiment>
<<3. Hardware configuration example>>
<<4. Conclusion>>

1. First Embodiment 1-1. Overview of First Embodiment

First, an overview of an information processing device according to a first embodiment of the present disclosure will be described with reference to FIG. 1. FIG. 1 is an explanatory diagram illustrating the outer appearance of the information processing device according to the first embodiment of the present disclosure.

As illustrated in FIG. 1, an information processing device 1 according to the first embodiment of the present disclosure is a glasses type display device that includes an imaging unit 110 and display units 180A and 180B.

The information processing device 1 displays a display object (a rendering result or the like of a 3D model) corresponding to content (text data, the 3D model, an effect, and the like) on the display units 180A and 180B on the basis of a captured image obtained when the imaging unit 110 images a real space. The content according to the embodiment may be, for example, information (descriptive text data, a navigation icon, a warning effect, or the like of an object in the real space) to be presented to a user to correspond to the real space or may be, for example, a 3D model such as a dynamically moving game character or a fixed building. An example of the content according to the embodiment will be described later. Also, a display object displayed on the display units 180A and 180B may be a virtual object.

The display units 180A and 180B are transmissive display units (see-through displays), and the user can view a real space along with an image displayed on the display units 180A and 180B even in a case in which the user wears the information processing device 1. Also, in a case in which a display object is a 3D model or the like with a depth, the display units 180A and 180B display images for the right and left eyes, respectively so that the user is allowed to be able to perceive binocular parallax. Note that, in the present disclosure, the transmissive display unit is a display capable of allowing a user to simultaneously view display by a display (the display units) and ambient light (or a video) of a real space (background) incident from a surface opposite to an exit surface of light by the display.

There has been concern of visibility of a real space which is a background for the user deteriorating depending on a kind of display object or display sizes (sizes displayed on the display units 180A and 180B). For example, in a case in which a display object is an object with high visibility such as a 3D model which has a complicated texture and is subjected to polygon rendering, it is difficult for the user to view a real space on which a region in which the display object is displayed (a display region) is superimposed. Accordingly, in a case in which a display size of the display object is large and a display region of the display object occupies most of the display units 180A and 180B, it has been difficult for the user to view the real space sufficiently.

In a case in which the user desires to view the real space sufficiently, such as a case in which the user performs dangerous work or important work, there has been concern of a display object hindering work of the user when the display object with high visibility is displayed with a large size.

Accordingly, the embodiment has been created in view of the foregoing circumstances. According to the embodiment, by performing display control such that a display object with low visibility is displayed in a case in which a display size of content is large, it is possible to prevent occurrence of a situation in which it is difficult for a user to view a background. Hereinafter, a configuration of the embodiment in which such advantageous effects can be realized will be described in detail.

1-2. Configuration of First Embodiment

The overview of the information processing device 1 according to a first embodiment of the present disclosure has been described above. Next, a configuration of the information processing device 1 according to the embodiment will be described with reference to FIGS. 2, 3, 4A, 4B, 5, 6A, 6B, 7, 8, and 9.

Figure 2:
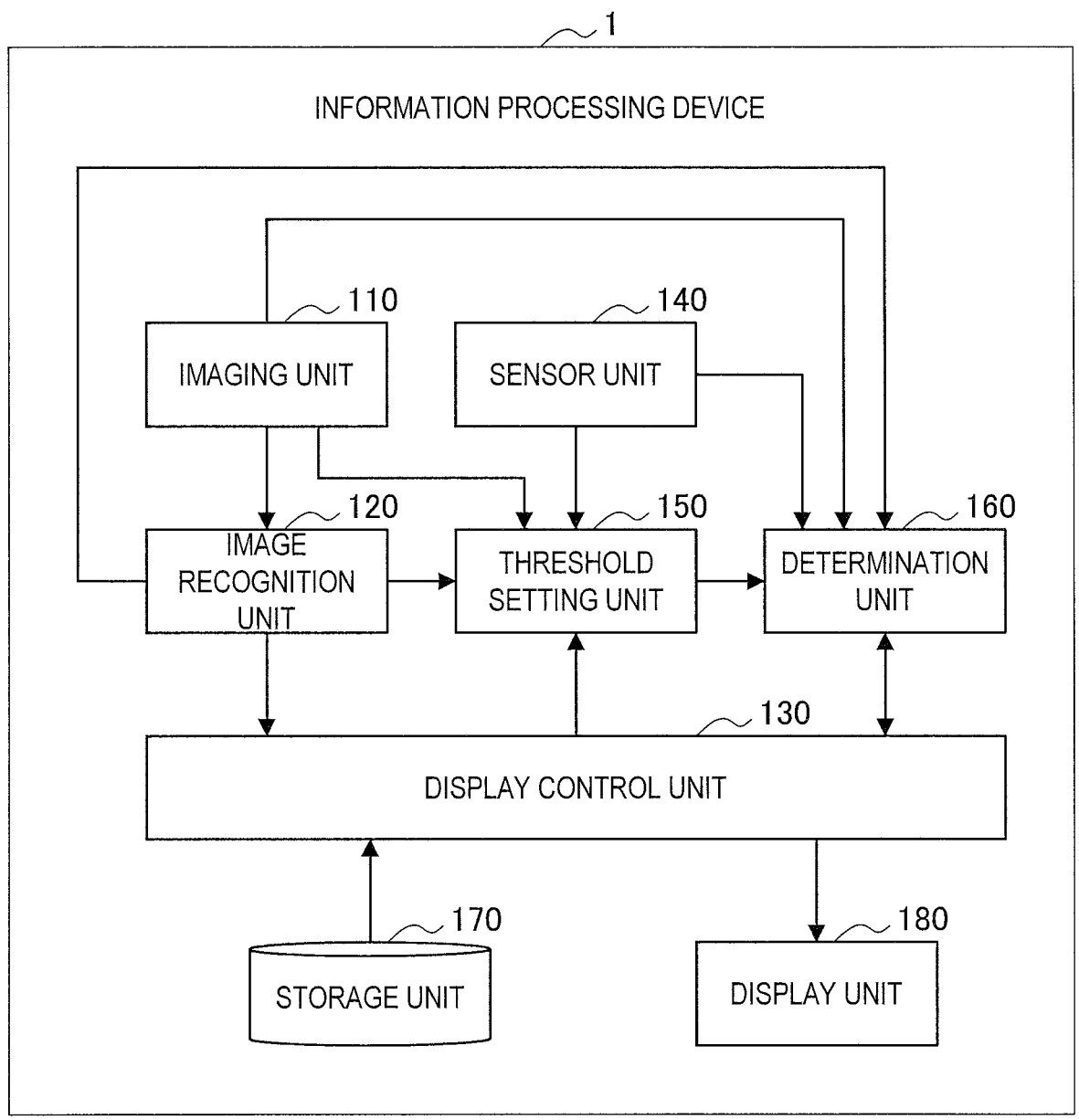
FIG. 2 is an explanatory diagram illustrating an example of a configuration of the information processing device according to the embodiment.

FIG. 2 is an explanatory diagram illustrating an example of the configuration of the information processing device 1 according to the embodiment. As illustrated in FIG. 2, the information processing device 1 includes an imaging unit 110, an image recognition unit 120, a display control unit 130, a sensor unit 140, a threshold setting unit 150, a determination unit 160, a storage unit 170, and a display unit 180.

(Imaging Unit)

The imaging unit 110 is a camera module that acquires an image. The imaging unit 110 acquires a captured image by imaging the real space using an image sensor such as a charge coupled device (CCD) or a complementary metal oxide semiconductor (CMOS). For example, the imaging unit 110 according to the embodiment may have the same angle of field as an angle of view of the user wearing the information processing device 1 or a range imaged by the imaging unit 110 may be seen as an angle of view of the user. Note that a captured image acquired by the imaging unit 110 is supplied to the image recognition unit 120.

Also, the imaging unit 110 may be a stereo camera that includes two image sensors and simultaneously acquires two images. In this case, the two image sensors are arranged horizontally. Thus, by analyzing a plurality of images acquired by the image recognition unit 120 to be described below through a stereo matching method or the like, it is possible to acquire 3-dimensional shape information (depth information) of the real space.

(Image Recognition Unit)

The image recognition unit 120 analyzes a captured image acquired by the imaging unit 110 and recognizes a 3-dimensional shape of the real space or an object (a real object), a marker, or the like in the real space. For example, the image recognition unit 120 may recognize the 3-dimensional shape of the real space and acquire the 3-dimensional shape information by performing a stereo matching method on a plurality of simultaneously acquired images or performing a structure from motion (SfM) method or the like on a plurality of chronologically acquired images. Also, the image recognition unit 120 may recognize an object, a marker, or the like in the real space and acquire information regarding the object, the marker, or the like by performing matching between feature point information prepared in advance and feature point information detected from the captured images. Note that the marker recognized by the image recognition unit 120 is a set of texture information of a specific pattern or image feature point information expressed by, for example, a 2-dimensional code or the like.

Also, the image recognition unit 120 may acquire user information (information regarding the user such as a behavior of the user) or environment information (information indicating an environment surrounding the user), or the like on the basis of information obtained through the object recognition. For example, in a case in which many objects which are frequently at an angle of field of the user in dangerous work are detected through the object recognition, the image recognition unit 120 may acquire user information indicating that the user is performing the dangerous work. Also, in a case in which an object that is dangerous to the user, such as an automobile approaching the user (an oncoming vehicle) or a pitfall, is detected through the object recognition, environment information indicating that the user is in a dangerous place or situation may be acquired. Note that the details of the user information and the environment information will be described later.

Note that the foregoing information acquired by the image recognition unit 120 is supplied to the display control unit 130 and the determination unit 160.

(Display Control Unit)

The display control unit 130 causes the transmissive display unit 180 to display a display object on the basis of the object information, the environment information, 3-dimensional information of the real space, and the like supplied from the image recognition unit 120. For example, the display control unit 130 may specify content corresponding to an object on the basis of object information of an object (information such as a kind, a position, or the like of the object) detected from a captured image and may specify a display object corresponding to the content. For example, the display control unit 130 may specify text data used to describe the object as the content corresponding to the object and specify a result obtained by rendering the text data using a predetermined font as the display object corresponding to the content. Note that information regarding the foregoing content or display object may be stored in the storage unit 170 and the display control unit 130 may directly acquire (specify) content or a display object to be specified from the storage unit 170. Also, the display control unit 130 may specify a display object by generating (for example, rendering) the display object so that the display object has characteristics related to visibility to be described below on the basis of the information regarding the content or the display object stored in the storage unit 170.

Also, the display control unit 130 specifies a position of the content defined in a virtual space (a 3-dimensional virtual space) used for calculation when the display control unit 130 performs rendering and a display position of the content on the display unit 180.

The position of the content may be specified in a virtual space, for example, on the basis of a position of an object (a real object) in a real space corresponding to the content. The position of the real object may be obtained, for example, on the basis of a recognition result of the real object by the image recognition unit 120. Also, in a case in which content is not fixed in accordance with a real object, like a game character or the like that can freely move, the position of the content may be dynamically set (specified) in a virtual space by an application.

Also, the display control unit 130 defines (specifies) a position of a viewpoint at which a rendering image of content is generated in a virtual space. The position of the viewpoint may be specified in the virtual space on the basis of a position of the user in the real space, may be set in response to a manipulation performed by the user, or may be dynamically set by an application. For example, the display control unit 130 disposes a virtual camera at the position of the viewpoint and renders the content. The display control unit 130 generates (renders) a rendering image to be shown by the virtual camera disposed at the position of the viewpoint on the basis of a calculation process for a shape of the content, a position of the content, the degree to which light shines, or the like. Note that a visual line direction used for rendering of the rendering image may be specified in accordance with a detection result of a position or an attitude of the display unit 180 that displays the rendering image. Also, the position or the attitude of the display unit 180 may be detected by the sensor unit 140 to be described below.

Note that the position of the content may be expressed as coordinate values on a coordinate system set in the virtual space. Also, in this case, the position of the viewpoint may be set as coordinate values on the coordinate system in which the position of the content is expressed in this way.

Also, the display position of the content may be specified on the basis of the position of the content and the position of the viewpoint. For example, as described above, the display control unit 130 may generate a rendering image to be pictured by a virtual camera disposed at the position of the viewpoint on the basis of the position or the like of the content so that the display position of the content on the display unit 180 is specified.

Also, the display control unit 130 specifies the display size of the content and the display object corresponding to the content with the display size is displayed on the display unit 180. For example, a size of the content (a content size) may be set in advance and a display size of the content may be specified on the basis of the content size. Also, the display size may be specified further on the basis of the position of the content and the position of the viewpoint. Also, in a case in which the position of the content is specified on the basis of the position of the real object, as described above, and the position of the viewpoint is specified on the basis of the position of the user, as described above, the display size may be specified on the basis of the position of the real object and the position of the user. For example, the display size of the content may be specified so that the display size of the content corresponding to the real object increases when the user is closer to the real object, and the display size of the content corresponding to the real object decreases when the user is distant from the real object. In this configuration, the user can perceive the display object corresponding to the content in association with the real object in the real space and can experience the display object more realistically.

Also, the display object corresponding to the content may be specified on the basis of the display size of the content. For example, the display control unit 130 may specify one display object as a display object to be displayed on the basis of the display size of the content among a plurality of display objects corresponding to the content.

For example, the display control unit 130 may specify display objects so that visibility of the display objects is different in accordance with the display sizes. For example, the display objects may be specified so that visibility of a second display object displayed with a second display size greater than a first display size is lower than visibility of a first display object displayed with the first display size.

The visibility of the first display object and the second display object described above may be different, for example, by causing at least one of a rendering method, a color, texture, transmittance, and a pattern to be different. For example, in the embodiment, when a rendering method for a display object is polygon rendering, the visibility of the display object is high. When the rendering method is wire frame rendering, the visibility of the display object is low. Also, when a display object has color (is expressed using colors other than white and black), the visibility of the display object is high. When a display object is monochrome (is expressed only with white and black), the visibility of the display object is low. Also, when a display object has texture, the visibility of the display object is high. When a display object has no texture, the visibility of the display object is low. Also, when transmittance of a display object is low (for example, when it is non-transparent), the visibility of the display object is high. When transmittance of a display object is high (for example, when it is semitransparent), the visibility of the display object is low. Also, when a display object has a pattern, the visibility of the display object is high. When a display object has no pattern, the visibility of the display object is low.

Note that the method of causing the visibility to be different is not limited to the foregoing methods. For example, a display object with low visibility may be generated by lessening color of the display object in accordance with color of a background on which the display object is superimposed. Also, a display object with low visibility may be generated by blurring the display object in response to adjustment or the like of depth of field in display. Also, a display object with low visibility may be generated by lowering lightness, color tone, vividness, or the like of the display object.

Also, hereinafter, a display object that has characteristics of higher visibility among characteristics of the above-described visibility is referred to as a normal object, and a display object that has characteristics of lower visibility is referred to as a special object in some cases. For example, the display control unit 130 may acquire a normal object from the storage unit 170 and generate (acquire) a special object by performing a process so that the normal object has characteristics of low visibility (performing a process of lowering the visibility) described above.

When the visibility of a display object is high, the user can easily view the display object and cannot view a background on which the display object is superimposed (a region on which the display object is superimposed in a background such as a real space) as easily. In contrast, when the visibility of a display object is low, the user cannot view the display object as easily but can easily view a background on which the display object is superimposed. Accordingly, in the above-described configuration, for example, in a case in which the user is unlikely to be hindered even when a display object with a small display size and high visibility is displayed, a display object with high visibility is displayed. On the other hand, in a case in which a display object with a large display size occupies most of the angle of view of the user, a display object with low visibility is displayed and it is easy for the user to view a background on which the display object is superimposed.

FIG. 3 is an explanatory diagram illustrating an example in which a display object is specified on the basis of a display size by the display control unit 130. D12 and D14 illustrated in FIG. 3 indicate the angle of view of the user wearing the information processing device 1.

At the angle of view D12, a display object M1 specified on the basis of a display size in the state of the angle of view D12 is displayed on the display unit 180 to be superimposed on a real space background. Here, the display object M1 is an object subjected to polygon rendering and the user cannot easily view a region on which the display object M1 is superimposed in the real space background.

On the other hand, at the angle of view D14, a display object M2 specified on the basis of a display size greater than the display size in the state of the angle of view D12 is displayed on the display unit 180 to be superimposed on the real space background. Here, the display object M2 is larger than the display object M1 and occupies most of the angle of view D14 of the user. However, the display object M2 is an object subjected to wire frame rendering and the user can view the real space background sufficiently even in a region on which the display object M2 is superimposed.

Note that the display control unit 130 according to the embodiment may specify the display object described above on the basis of determination by the determination unit 160 to be described below. That is, the display control unit 130 according to the embodiment may specify one of the first display object and the second display object as a display object to be displayed on the basis of the determination by the determination unit 160 to be described below. For example, in a case in which the determination unit 160 to be described below determines that an object with low visibility should be displayed, the display control unit 130 specifies a special object (an object with low visibility) as a display object corresponding to content and causes the display unit 180 to display the special object.

Also, the display control unit 130 may specify a display object corresponding to content on the basis of a result of comparison between a predetermined threshold and a display size performed by the determination unit 160. That is, the display control unit 130 according to the embodiment may specify one of the first display object and the second display object in response to the comparison between the predetermined threshold and the display size performed by the determination unit 160 as a display object to be displayed. For example, in a case in which the display size is greater than the threshold, a special object may be specified as the display object corresponding to the content. In a case in which the display size is equal to or less than the threshold, a normal object may be specified as the display object corresponding to the content.

(Sensor Unit)

The sensor unit 140 illustrated in FIG. 2 senses a user or an environment surrounding the user to acquire sensor information. For example, the sensor unit 140 may include various sensors such as a microphone, a Global Positioning System (GPS) sensor, an acceleration sensor, a sense of vision (visual line, gazing point, focal point, nictation, or the like) sensor, a biological information (heart rate, body temperature, blood pressure, brain waves, or the like) sensor, a gyro sensor, and an illumination sensor. Also, the sensor unit 140 supplies the acquired information to the threshold setting unit 150 and the determination unit 160.

(Threshold Setting Unit)

The threshold setting unit 150 sets a predetermined threshold for determination by the determination unit 160 to be described below. For example, the predetermined threshold set by the threshold setting unit 150 is compared to a display size by the determination unit 160 to be described below. Also, as described above, the display control unit 130 specifies a display object corresponding to content on the basis of the comparison result. Accordingly, the display object corresponding to the content is specified by comparing the predetermined threshold to the display size.

The predetermined threshold may be set based on at least one of, for example, user information regarding the user, content information regarding the content, environment information indicating an environment surrounding the user, and device information regarding a device that displays the display object.

Here, the user information may include, for example, behavior information indicating a behavior of the user, motion information indicating a motion of the user, biological information, gazing information, and the like. The behavior information is, for example, information indicating a current behavior of the user during stopping, walking, running, driving an automobile, stepping stairs, or the like and may be recognized and acquired from sensor information or the like such as acceleration acquired by the sensor unit 140. Also, the motion information is information such as a movement speed, a movement direction, movement acceleration, an approach to a position of content, or the position of the viewpoint and may be recognized and acquired from sensor information or the like such as GPS data or acceleration acquired by the sensor unit 140. Also, the biological information is information such as a heart rate of the user, body temperature perspiration, a blood pressure, a pulse rate, respiration, nictation, an eye movement, or a brain wave and may be acquired by the sensor unit 140. Also, the gazing information is information regarding gazing of the user, such as a visual line, a point of gazing, a focal point, or convergence of both eyes and may be acquired by the sensor unit 140.

Also, the content information may include information regarding, for example, a position of the content, a display position of the content, a color, animation characteristics, a content attribute, a content resolution, a content size, and the like. The display position may be a position at which the display object corresponding to the content is displayed on the display unit 180. Also, information regarding the color may be information regarding a color of a normal object corresponding to the content. Also, information regarding the animation characteristics may be, for example, information such as a movement speed, a movement direction, a trajectory, an updating frequency (motion frequency), or the like of the content. Information regarding the content attribute may be, for example, information such as a kind of content (text data, an image, a game character, an effect, or the like), importance, or priority. Also, information regarding the content resolution may be information regarding a resolution of the content. Also, information regarding the content size may be information regarding a size of the content (which does not depend on the position of the content, the position of the viewpoint, or the like) set for each piece of content. For example, the above-described content information may be stored in the storage unit 170 and supplied to the threshold setting unit 150 via the display control unit 130 or may be calculated by the display control unit 130 and supplied to the threshold setting unit 150.

Also, the environment information may include, for example, information such as a background, a peripheral situation, a place, illumination, an altitude, an atmospheric temperature, a wind direction, an air volume, and a time. Information regarding the background may be, for example, information such as a color (background color) of a background in the real space or the like, a kind of information in the background, or importance, may be acquired by the imaging unit 110, or may be recognized and acquired by the image recognition unit 120. Also, information regarding the peripheral situation may be information indicating whether a person other than the user or an automobile is in the periphery, may be information such as the degree of congestion or the like, or may be recognized and acquired by the image recognition unit 120. Also, information regarding the place may be, for example, information indicating characteristics of a place where the user is located or the like, such as an indoor, outdoor, underwater, or hazard place or may be information indicating a meaning of the place for the user, such as a house, a company, a familiar place, or a place in which the user visits for the first time. The information regarding the place may be acquired by the sensor unit 140 or may be recognized and acquired by the image recognition unit 120. Also, information regarding illumination, an altitude, an atmospheric temperature, a wind direction, an air volume, and a time (for example, a GPS time) may be acquired by the sensor unit 140.

Also, the device information is information regarding a device (in the embodiment, the information processing device 1) that performs display or the like of the first display object and the second display object and may include information regarding, for example, a display size, a display resolution, a battery, a 3D display function, a device position, and the like. The display size is a size of the display unit 180 (display) in a real space and the display resolution is a resolution of the display unit 180. Also, information regarding the battery is information indicating a battery state (during charging or during battery use), a remaining battery, a battery capacity, or the like of the information processing device 1. Also, information regarding the 3D display function is information indicating presence or absence of the 3D display function of the information processing device 1, a parallax amount appropriate for 3D display (a parallax amount at which the user can stereoscopically view in comfort), a kind of 3D display scheme. Also, the device position is, for example, information indicating a wearing position, an installation position, or the like of the information processing device 1.

Hereinafter, several examples of setting of the threshold by the threshold setting unit 150 on the basis of the user information, the content information, the environment information, and the device information described above will be described.

For example, when a display object is close to a gazing point of the user, the display object hinders the user with ease. Therefore, the threshold setting unit 150 may set the threshold so that the threshold decreases as a distance between the display position of the content and the position of the gazing point included in the user information decreases. For example, when coordinates of the gazing point are ($P_1x$, $P_1y$) and coordinates of the display position are ($P_2x$, $P_2y$), a threshold $S_{th}$ is obtained as in the following expression using a coefficient a for changing the threshold in accordance with a minimum value $S_{min}$ of the threshold.

[Math. 1]

$$S_{th} = a\sqrt{(P_2x - P_1x)^2 + (P_2y - P_1y)^2} + S_{min} \qquad (1)$$

Note that the threshold setting unit 150 may use the position of a screen center as the position of the foregoing gazing point in a case in which information regarding the accurate position of the gazing point cannot be obtained (for example, a sensor capable of acquiring the gazing point is not usable).

Also, as movement of the user is rapider, the angle of view of the user is narrowed, and thus the display object hinders the user with ease. Therefore, the threshold setting unit 150 may set the threshold so that the threshold decreases as the movement of the user is rapider. For example, the predetermined threshold may be set in accordance with behavior information regarding movement of the user during stopping, walking, running, or the like included in the user information. Also, when v is magnitude of a movement speed included in the user information, the threshold $S_{th}$ is obtained as in the following expression using a coefficient a' for changing the threshold in accordance with a speed (magnitude of the movement speed).

[Math. 2]

$$S_{th} = \frac{a'}{v} \qquad (2)$$

Also, since a display object of which a motion is frequently updated hinders the user with ease, the threshold setting unit 150 may set the threshold so that the threshold decreases as an updating frequency included in the content information is frequent.

Also, since a display object which moves at a slow speed and stays long within the angle of view of the user hinders the user with ease, the threshold setting unit 150 may set the threshold so that the threshold decreases as the magnitude of a movement speed of the content included in the content information decreases.

Also, in a case in which there is important information in a background, a display object with high visibility hinders the user with ease when the display object is superimposed on the important information. Therefore, the threshold setting unit 150 may set the threshold on the basis of information regarding a background included in the environment information. For example, the threshold setting unit 150 may set the threshold so that the threshold decreases as importance of information included in the background is higher. Also, the threshold setting unit 150 may set the threshold so that the threshold decreases as an area of the information with high importance included in the background is larger.

Also, when a display object with high visibility is displayed in a dark environment, there is concern that attention of the user may concentrate on the display object, which hinders work or the like. Therefore, the threshold setting unit 150 may set the threshold on the basis of information regarding illumination included in the environment information. For example, the threshold setting unit 150 may set the threshold so that the threshold decreases as illumination is lower (the circumference of the user is dark).

Also, in a case in which the position of a viewpoint approaches the position of content in response to movement of the user or a manipulation of the user, the user is considered to have an intention to desire to view a display object corresponding to the content. Further, in a case in which the position of the content is moved and approaches the position of the viewpoint in accordance with a structure in an application (for example, random movement of a character that is the content), there is concern of the large display object being displayed against an intention of the user. Accordingly, the threshold setting unit 150 may change the threshold on the basis of a change in a distance between the position of the viewpoint of the user and the position of the content. For example, the threshold setting unit 150 may set the threshold so that the threshold increases in a case in which the position of the viewpoint and the position of the content are closer because of movement of the position of the viewpoint (the position of the viewpoint is moved toward the position of the content), and the threshold decreases in a case in which the position of the viewpoint and the position of the content are closer because of movement of the position of the content (the position of the content is moved toward the position of the viewpoint).

Also, the threshold setting unit 150 may set the threshold so that the threshold increases in a case in which the visibility of a normal object corresponding to the content is not high on the basis of information regarding the color or the like of the content included in the content information. For example, in a case in which only white and block are included in the color of the content, the visibility of the normal object corresponding to the content is not high and it is difficult to hinder the user. Therefore, the large threshold may be set.

The examples of the setting of the threshold by the threshold setting unit 150 have been described above, but the method of setting the threshold by the threshold setting unit 150 is not limited to the foregoing examples. The threshold setting unit 150 may set the threshold so that the threshold decreases in a case in which content hinders the user with ease without being limited to the foregoing methods. In this configuration, in a situation in which the content hinders the user with ease, a display object (a special object) which has low visibility and is unlikely to hinder the user is displayed with ease.

(Determination Unit)

The determination unit 160 compares the predetermined threshold set by the threshold setting unit 150 with a display size of content and supplies a comparison result to the display control unit 130. The display size used for the comparison by the determination unit 160 may be, for example, an area, may be a height, a width, or a ratio of a region occupied by a display object corresponding to the content on the display unit 180, or may be a value calculated by combining them.

Also, the determination unit 160 may determine whether a display object with low visibility is displayed (specified) (whether display is switched forcibly irrespective of a display size) on the basis of the user information, the content information, the environment information, the device information, or the like described above. Hereinafter, several examples of the determination (hereinafter referred to as forcible switching determination) by the determination unit 160 will be described.

For example, the determination unit 160 may determine that a display object with low visibility should be displayed in a case in which the image recognition unit 120 recognizes that the user performs dangerous work or high urgent work.

The determination unit 160 may determine that a display object with low visibility should be displayed in a case in which the image recognition unit 120 recognizes that the user is in a dangerous place or situation.

Also, the determination unit 160 may perform the forcible switching determination on the basis of information regarding a background included in the environment information. For example, the determination unit 160 may determine that a display object with low visibility should be displayed in a case in which importance of information included in the background is equal to or greater than a predetermined value.

Also, the determination unit 160 may determine that a display object with low visibility should be displayed in a case in which a plurality of display objects are displayed and a parallax occurring in the display unit 180 is equal to or greater than a predetermined value (for example, an appropriate parallax amount) because of a depth difference between the display objects. In this case, the plurality of display objects may all be switched to display objects with low visibility or only some of the display objects (for example, display objects or the like close to a gazing point of the user) may be switched to display objects with low visibility.

Also, the determination unit 160 may determine that a display object with low visibility should be displayed in a case in which contradiction occurs in a depth relation between a real object of a real space and content. For example, in a case in which the content is located at a position further back than the real object of the real space is, a display object corresponding to the content should be hidden by the real object. However, the display unit 180 may display the display object corresponding to the content in front of the real object because of its structure. Accordingly, in a case in which the content is located at a position further back than the real object of the real space is, the determination unit 160 may determine that a display object with low visibility should be displayed.

Also, the determination unit 160 may determine that a display object with low visibility should be displayed on the basis of gazing information (information regarding a gazing point, a focal point, a convergence of both eyes, or the like) included in the user information. For example, the determination unit 160 may use the gazing information to determine whether the user gazes at the display object or gazes at a background of the real space and determine that a display object with low visibility should be displayed in a case in which the user gazes at the background. Note that whether the user gazes at one of the display object displayed on the display unit 180 and the background of the real space can be determined using, for example, information regarding a focal distance or a convergence distance of the user.

Also, the determination unit 160 may determine that a display object with low visibility should be displayed on the basis of biological information included in the user information. For example, the determination unit 160 may use biological information to determine that a display object with low visibility should be displayed in a case in which it is determined that the user is nervous, impatient, or the like. In this configuration, it is possible to perform display control further corresponding to a situation of the user.

The examples of the forcible switching determination by the determination unit 160 have been described above, but the method of the forcible switching determination by the determination unit 160 is not limited to the foregoing examples. The determination unit 160 may determine that a display object with low visibility (a display object which is unlikely to hinder the user) should be displayed in a case in which content hinders the user with ease, without being limited to the foregoing methods.

(Storage Unit)

The storage unit 170 stores information regarding content (content information) and information regarding display objects. The storage unit 170 may store a display object (a normal object) with high visibility and a display object (a special object) with low visibility as display contents corresponding to one piece of content and may supply the display objects to the display control unit 130. Also, the storage unit 170 may store only a normal object as a display object corresponding to one piece of content and the display control unit 130 may acquire (generate) a special object by performing a specific process on the normal object supplied from the storage unit 170.

Content related to the content information stored in the storage unit 170 may include, for example, text data, an image, a 3D model, an effect, a marking, a silhouette, and the like. Hereinafter, several examples of content and display objects corresponding to the content will be described with reference to FIGS. 4A, 4B, 5, 6A, 6B, 7, and 8. FIGS. 4A, 4B, 5, 6A, 6B, 7, and 8 are explanatory diagrams illustrating examples of content according to the embodiment. Note that display objects illustrated in FIGS. 4A, 4B, 5, 6A, 6B, 7, and 8 to be referred to below are all examples of normal objects (objects with high visibility). The storage unit 170 may store special objects (objects with lower visibility) corresponding to the content in addition to the normal objects illustrated in FIGS. 4A, 4B, 5, 6A, 6B, 7, and 8.

Figure 4A:
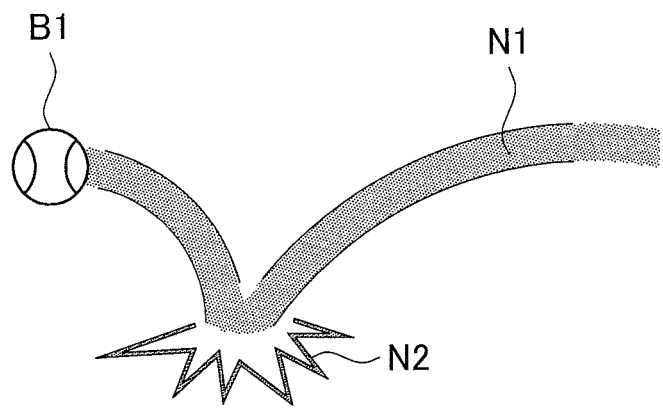
FIG. 4A is an explanatory diagram illustrating an example of content according to the embodiment.
Figure 4B:
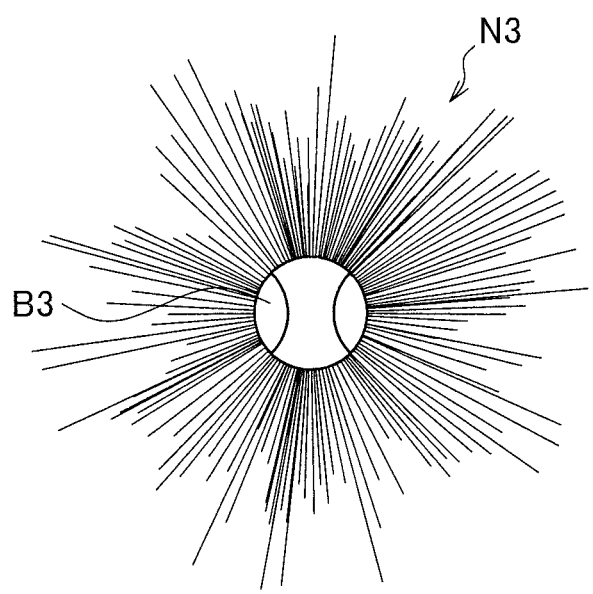
FIG. 4B is an explanatory diagram illustrating an example of content according to the embodiment.

For example, the content according to the embodiment may be an effect or the like of emphasizing or presenting a motion of a real object or another display object (hereinafter collectively referred to as an object in some cases). For example, a display object N1 illustrated in FIG. 4A is a display object corresponding to content such as a trail effect indicating a trajectory of an object B1. Also, a display object N2 illustrated in FIG. 4A is a display object corresponding to content such as an effect of emphasizing a falling spot of the object B1. Also, a display object N3 illustrated in FIG. 4B is a display objet corresponding to content such as an effect of presenting an object B3 moving at a high speed.

Figure 5:
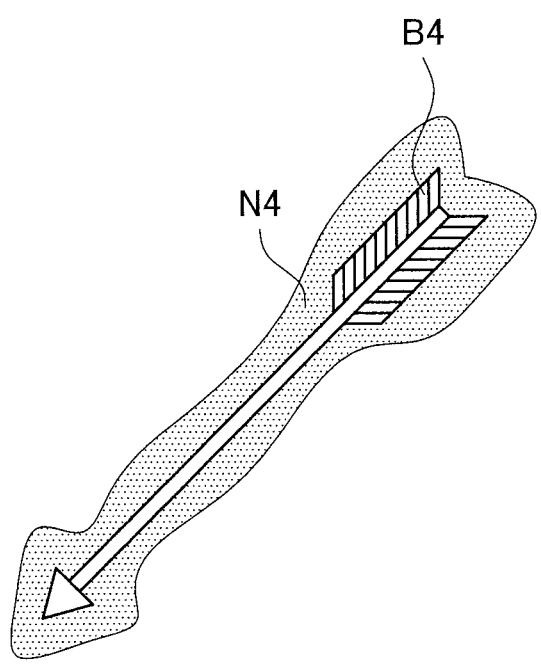
FIG. 5 is an explanatory diagram illustrating an example of content according to the embodiment.
Figure 6A:
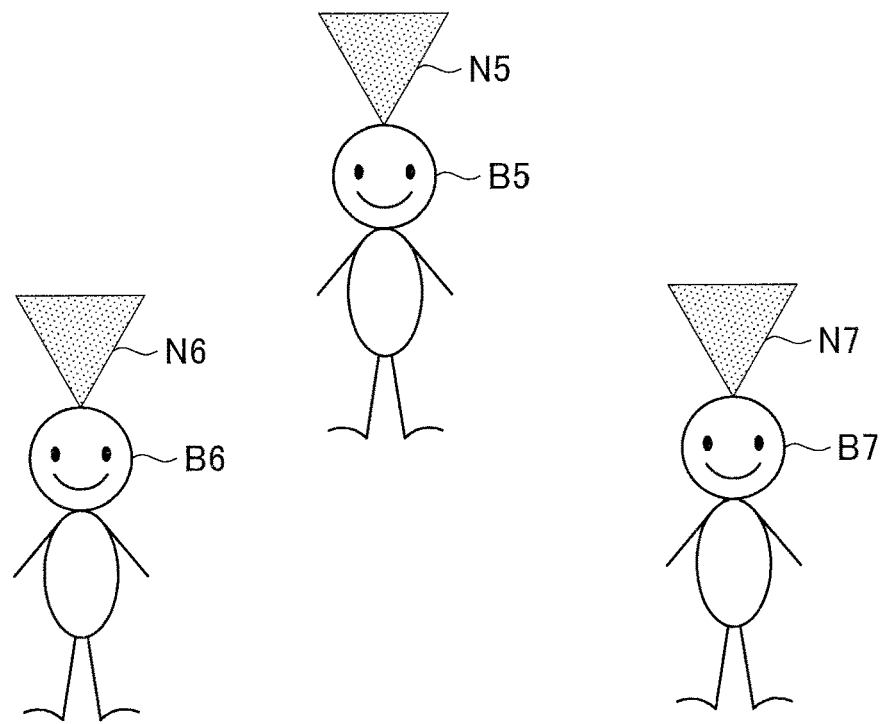
FIG. 6A is an explanatory diagram illustrating an example of content according to the embodiment.
Figure 6B:
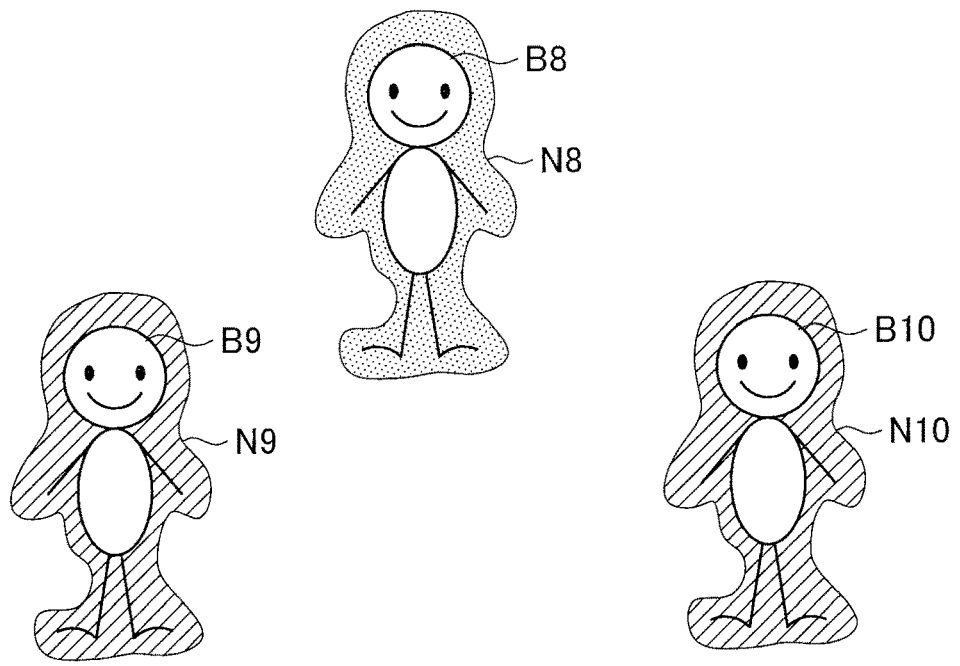
FIG. 6B is an explanatory diagram illustrating an example of content according to the embodiment.

Also, the content according to the embodiment may be a marking associated with an object in a real space or a virtual space. In particular, the content according to the embodiment may be a marking indicating a warning of a specific object or emphasis on a position, an attribute, or the like of this object in a case in which this object is detected. For example, a display object N4 illustrated in FIG. 5 is a display object corresponding to content such as a marking for a warning showing that an object B4 within the angle of field of the user is dangerous or is moving at a high speed. Also, display objects N5 to N7 illustrated in FIG. 6A are display objects corresponding to content such as a marking for emphasizing the positions of objects (people) B5 to B7 within the angle of field of the user. Also, display objects N8 to 10 illustrated in FIG. 6B are display objects corresponding to content such as a marking indicating attributes of objects (people) B8 to B10 within the angle of field of the user. FIG. 6B illustrates the fact that the display object N8, and the display objects N9 and N10 are displayed with different colors to indicate that the object (person) B8, and the objects (people) B9 and B10 have different attributes. Note that the attribute indicated by the marking may be, for example, a relationship with a user (oneself) in a game, a sports team, or SNS, an age, a sex, or the like.

Figure 7:
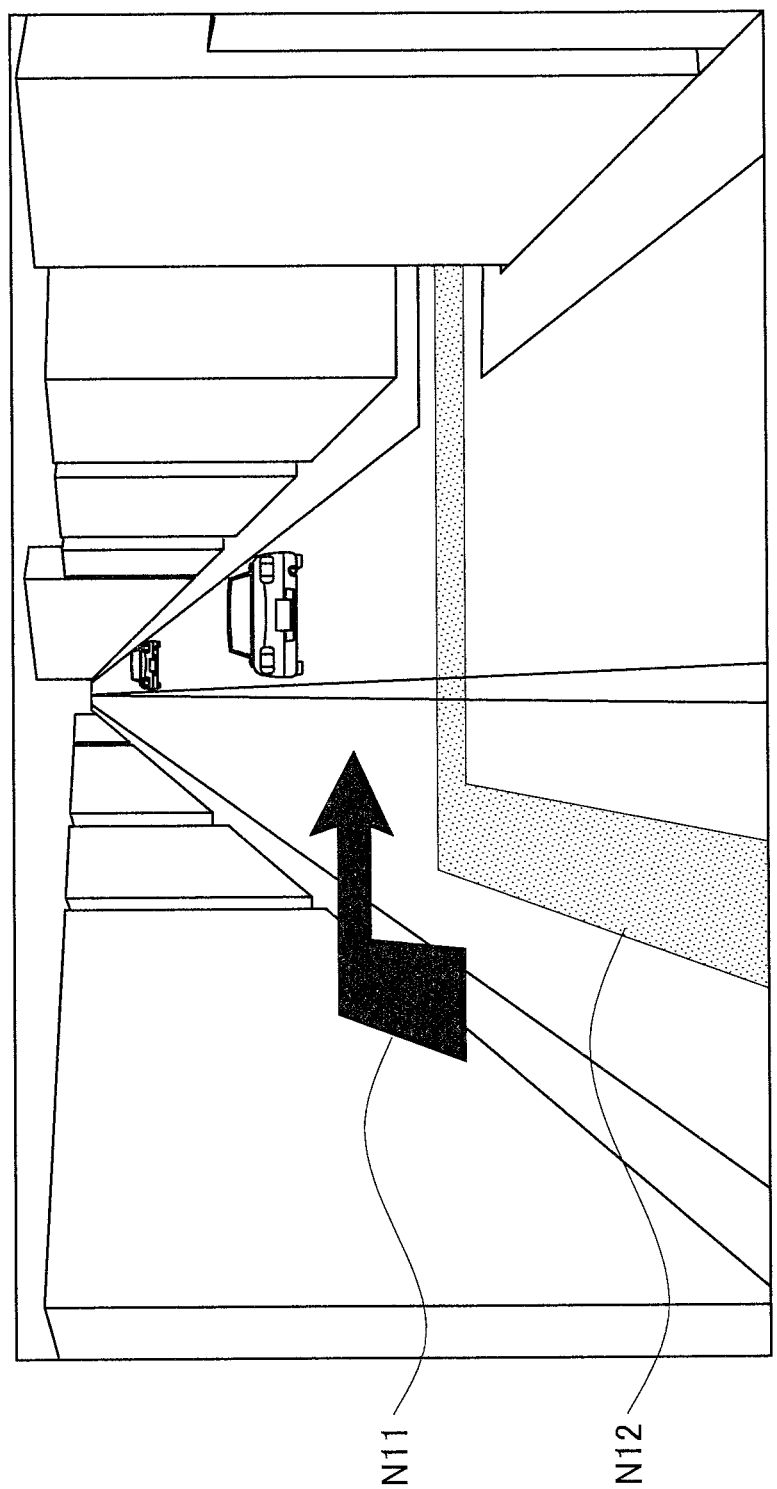
FIG. 7 is an explanatory diagram illustrating an example of content according to the embodiment.

Also, the content according to the embodiment may be navigation indicating a sample of a behavior or a path in a real space or a virtual space. For example, a display object N11 illustrated in FIG. 7 is a display object corresponding to content such as navigation indicating a direction in which the user travels. Also, a display object N12 illustrated in FIG. 7 is a display object corresponding to content such as navigation indicating a route (travel route) along which the user travels. Note that the example of the navigation is not limited to the foregoing examples. For example, the navigation may be, for example, navigation indicating a sample (a line in golf or a pass trajectory in soccer) in sports.

Figure 8:
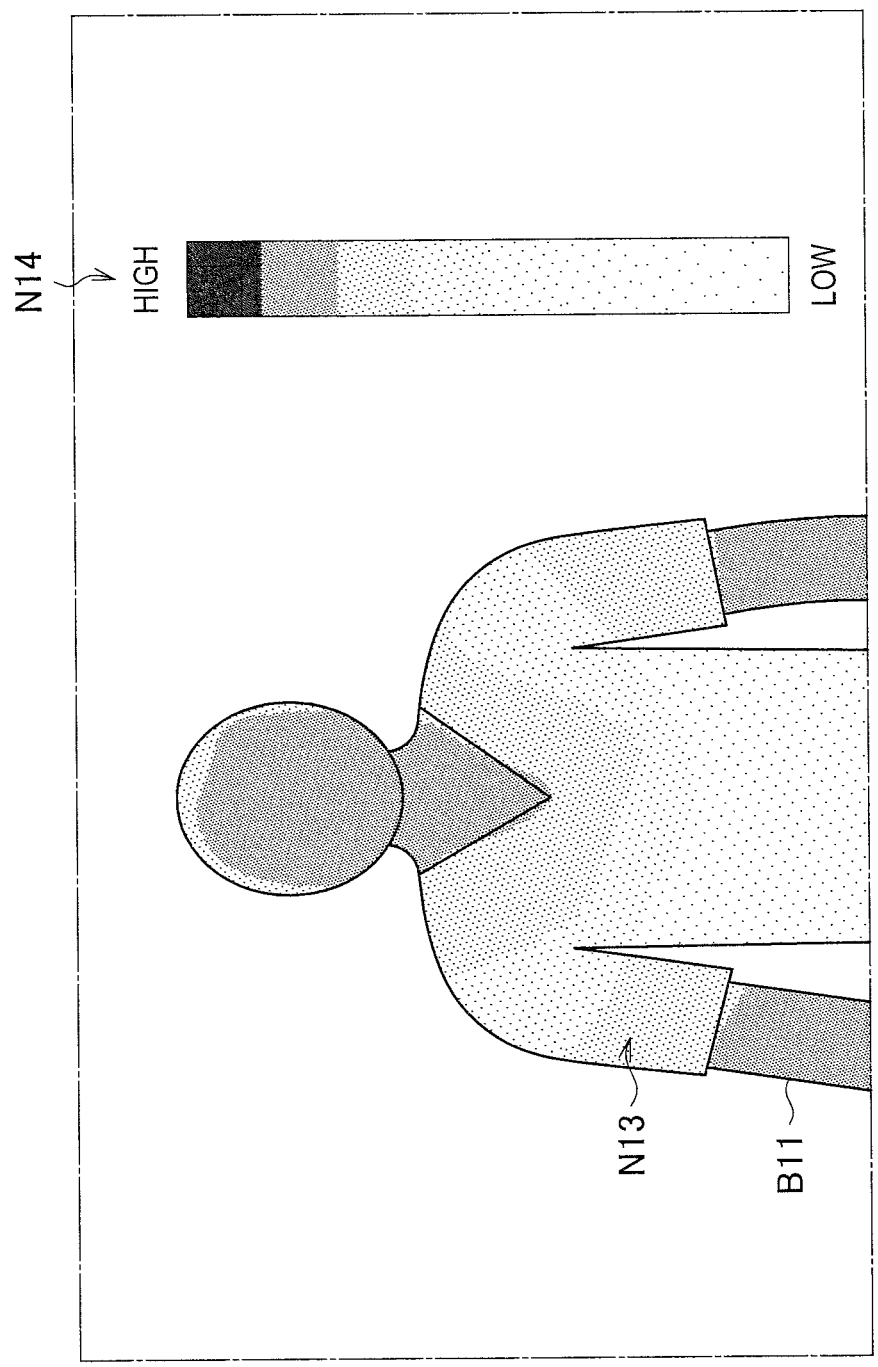
FIG. 8 is an explanatory diagram illustrating an example of content according to the embodiment.

Also, the content according to the embodiment may be a silhouette superimposed on an object or a sensing result related to this object. A display object N13 illustrated in FIG. 8 is a display object corresponding to content such as a sensing result (thermography) related to a temperature distribution of an object (person) B11. Note that a display object N14 illustrated in FIG. 8 is a display object that includes text and an image indicating auxiliary information (legend) related to the sensing result.

The examples of the content according to the embodiment have been described above with reference to FIGS. 4A, 4B, 5, 6A, 6B, 7, and 8, but the content according to the embodiment is not limited to the foregoing examples. For example, the content according to the embodiment may be a 3D model or an image indicating a game character, an item, a building, or the like in a game. Also, the content according to the embodiment may be a 3D model or an image (for example, a so-called ghost car in a racing game) indicating a previous history in a game or navigation. Also, the content according to the embodiment may be an object such as a surrounding person or the like, a manual regarding this object, or text data indicating property information (a name, a speed, an attribute, or the like), or the like. Note that a display position of the content may be a position superimposed on this object or may be a position near the object which is not superimposed on the object. Also, the content according to the embodiment may be a virtual advertisement, a banner, or the like for which any position of a space is set as a display position.

(Display Unit)

Figure 9:
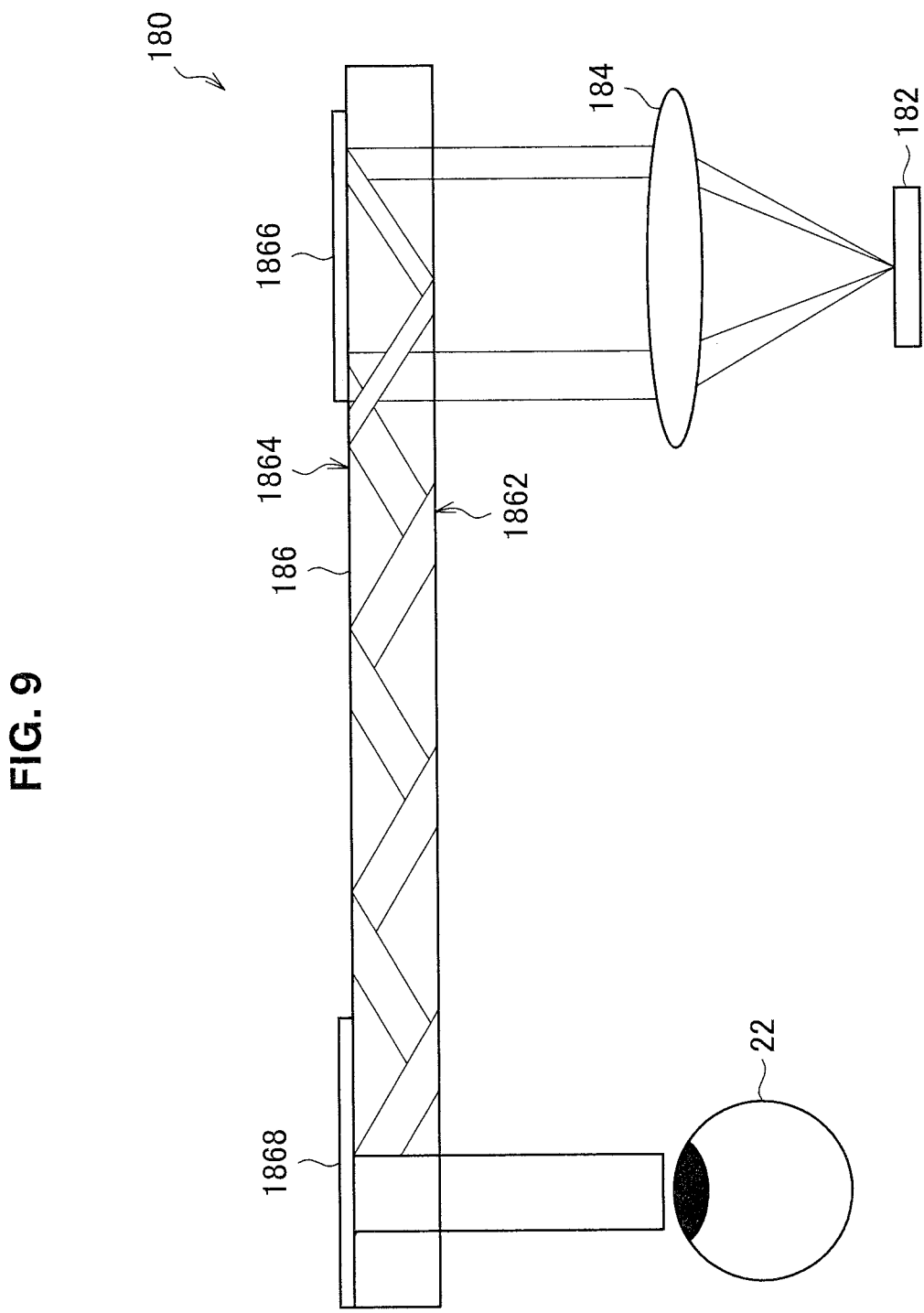
FIG. 9 is an explanatory diagram illustrating an example of a configuration of the display unit according to the embodiment.

The display unit 180 is an optical see-through display (an example of a transmissive display unit) that displays a display object. For example, the display unit 180 may be a display device that is worn on the head of the user for use. Also, the display unit 180 may be a display device that enables the user to simultaneously view an image of a real space and a virtual object (for example, at least one of the first display object and the second display object). Hereinafter, an example of a configuration of the display unit 180 will be described with reference to FIG. 9. FIG. 9 is an explanatory diagram illustrating the example of the configuration of the display unit 180.

As illustrated in FIG. 9, the display unit 180 according to the embodiment includes a reflective spatial light modulation unit 182, a collimating optical system 184 including a finder lens and the like, and a hologram type light-guiding plate (a wave guide) 186. The light-guiding plate 186 includes optical surfaces 1862 and 1864 that face each other in a depth direction of a pupil 22 of the user and reflective volume hologram gratings 1866 and 1868 that are installed on the optical surface 1864 and have a uniform interference fringe pitch of a hologram surface regardless of a position.

As illustrated in FIG. 9, light emitted when the spatial light modulation unit 182 modulates the image is set as a parallel light flux group in which angles of field are mutually different by the collimating optical system 184 to be incident on the light-guiding plate 186 from the optical surface 1862. The light incident on the light-guiding plate 186 is incident on the reflective volume hologram grating 1866 and is diffracted and reflected by the reflective volume hologram grating 1866. The light diffracted and reflected by the reflective volume hologram grating 1866 is guided while being repeatedly totally reflected between the optical surfaces 1862 and 1864 inside the light-guiding plate 186 to travel toward the reflective volume hologram grating 1868. The light incident on the reflective volume hologram grating 1868 deviates from a total reflection condition by diffractive reflection, is emitted from the light-guiding plate 186, and is incident on the pupil 22 of the user.

Note that the configuration of the transmissive display unit 180 is not limited to the foregoing example. For example, the display unit 180 may have a configuration in which a reflected image is displayed using a half mirror or the like or may have a configuration in which an image is displayed by radiating light to retinas of the user.

1-3. Operation of First Embodiment

Figure 10:
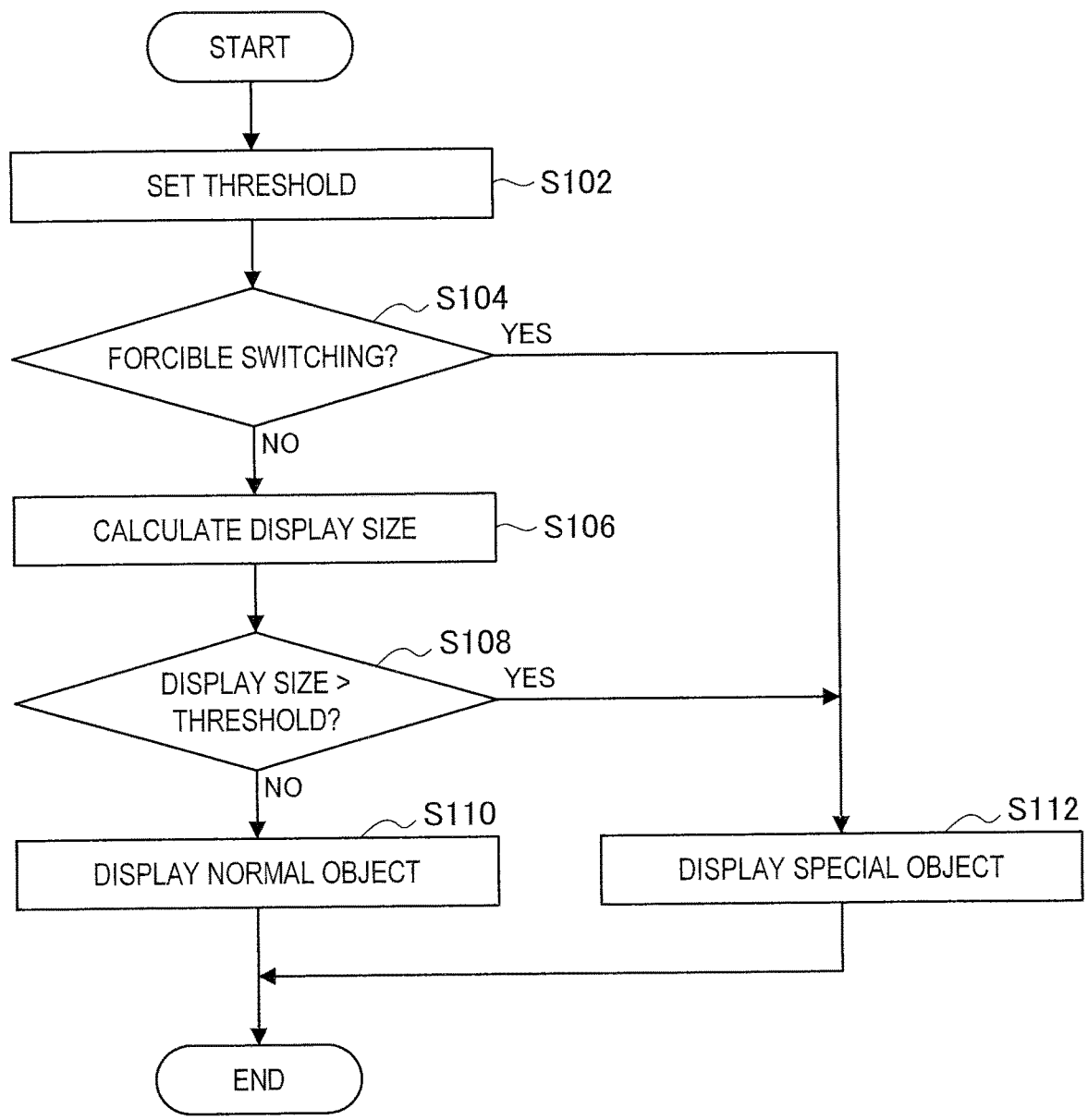
FIG. 10 is a flowchart for describing an example of an operation of the information processing device according to the embodiment.

The example of the configuration of the information processing device 1 according to the first embodiment of the present disclosure has been described above. Next, an example of an operation of the information processing device 1 according to the embodiment will be described with reference to FIG. 10 particularly focusing on an operation of specifying a display object by the display control unit 130, the threshold setting unit 150, and the determination unit 160. FIG. 10 is a flowchart for describing an example of an operation of the information processing device 1 according to the embodiment.

First, the threshold setting unit 150 sets a threshold on the basis of user information, content information, environment information, device information, or the like (S102). Subsequently, the determination unit 160 determines whether a display object with low visibility should be displayed, irrespective of a display size (forcible switching determination) (S104).

In a case in which it is determined that the display object with low visibility should be displayed in the forcible switching determination (YES in S104), the display control unit 130 specifies a special object as a display object to be displayed and causes the display unit 180 to display the special object (S112).

Conversely, in a case in which it is not determined that the display object with low visibility should be displayed in the forcible switching determination (NO in S104), the display control unit 130 calculates a display size of content (S106).

Subsequently, the determination unit 160 compares the threshold set by the threshold setting unit 150 to the display size (S108). In a case in which the display size is equal to or less than the threshold (NO in S108), the display control unit 130 specifies a normal object as a display object to be displayed and causes the display unit 180 to display the normal object (S110). Conversely, in a case in which the display size is greater than the threshold (YES in S108), the display control unit 130 specifies the special object as the display object to be displayed and causes the display unit 180 to display the special object (S112).

Note that to display the display object in accordance with the display size in the current state, the above-described series of processes may be repeatedly performed periodically or as soon as the series of processes ends.

1-4. Advantageous Effects of First Embodiment

The first embodiment of the present disclosure has been described above. According to the embodiment, by specifying a display object on the basis of a display size of content, it is possible to prevent occurrence of a situation in which it is difficult for the user to view a background. For example, in a case in which the display size is greater than the predetermined threshold, a display object with low visibility (for example, a semitransparent display object) is displayed, and thus the user can view the background even in a region on which the display object is superimposed on the background.

2. Second Embodiment

2-1. Overview of Second Embodiment

In the above-described first embodiment, the example in which the display object specified on the basis of the display size of the content is displayed has been described. On the other hand, an example of an information processing device that causes a display object specified on the basis of a positional relation between the position of content and the position of a viewpoint to be displayed will be described according to a second embodiment.

In the information processing device according to the second embodiment, occurrence of a situation in which it is difficult for a user to view a background is prevented by performing display control such that a display object with low visibility is displayed in a case in which the position of content and the position of a viewpoint have a close positional relation. Hereinafter, a configuration and an operation of the second embodiment in which the foregoing advantageous effects are obtained will be sequentially described in detail.

2-2. Configuration of Second Embodiment

The information processing device 1 according to the second embodiment of the present disclosure is a glasses type display device that includes a transmissive display unit like the information processing device 1 according to the first embodiment. Since the information processing device 1 according to the embodiment has the configuration similar to a part of the information processing device 1 according to the first embodiment, the description thereof will be appropriately omitted.

The outer appearance of the information processing device 1 according to the embodiment is similar to the outer appearance of the information processing device 1 according to the first embodiment described with reference to FIG. 1. Also, the information processing device 1 according to the embodiment includes the imaging unit 110, the image recognition unit 120, the display control unit 130, the sensor unit 140, the threshold setting unit 150, the determination unit 160, the storage unit 170, and the display unit 180, like the information processing device 1 according to the first embodiment illustrated in FIG. 2. Since the configurations of the imaging unit 110, the image recognition unit 120, and the display unit 180 according to the embodiment are substantially the same as the configurations of the imaging unit 110, the image recognition unit 120, the sensor unit 140, and the display unit 180 according to the first embodiment, the description thereof will be omitted. Hereinafter, the display control unit 130, the threshold setting unit 150, the determination unit 160, and the storage unit 170 according to the embodiment will be described focusing on differences from the display control unit 130, the threshold setting unit 150, the determination unit 160, and the storage unit 170 according to the first embodiment.

(Display Control Unit)

The display control unit 130 according to the embodiment causes the transmissive display unit 180 to display a display object on the basis of 3-dimensional information of the real space supplied from the image recognition unit 120, object information, environment information, and the like, like the display control unit 130 according to the first embodiment.

The display control unit 130 according to the embodiment specifies a display object which the display unit 180 is caused to display on the basis of a positional relation between the position of content defined in a virtual space and the position of a viewpoint defined in the virtual space to generate a rendering image of the content. For example, the display control unit 130 performs display control such that a first virtual object corresponding to the content is contained in the rendering image of the content to be displayed in a case in which the position of the content and the position of the viewpoint are determined to have a first positional relation, and a second virtual object corresponding to the content is contained in the rendering image to be displayed in a case in which the position of the content and the position of the viewpoint are determined to have a second positional relation. Also, here, in a case in which a distance between the position of the content and the position of the viewpoint in the second positional relation is shorter than a distance between the position of the content and the position of the viewpoint in the first positional relation, the display control unit 130 according to the embodiment may specify the display object so that the visibility of the second display object is lower than the visibility of the first display object.

Note that in a case in which the position of the content is set in the virtual space in association with an object in the real space, the position of the viewpoint may be specified on the basis of the position of the user in the real space. Also, as described in the first embodiment, the position of the content and the position of the viewpoint may be expressed as coordinates values in a coordinate system set in the virtual space.

For example, the display control unit 130 may perform the foregoing display control by specifying a display object corresponding to the content on the basis of a distance between the position of the content and the position of the viewpoint (hereinafter simply referred to as a distance in some cases). In this configuration, the display control unit 130 can cause an appropriate display object to be displayed in accordance with the distance between the position of the content and the position of the viewpoint.

Also, like the first embodiment, the visibility of the first display object and the second display object according to the embodiment described above may be different, for example, by causing at least one of a rendering method, a color, a texture, transmittance, and a pattern to be different. Since the foregoing characteristics and the relation between the high visibility and the low visibility have been described in the first embodiment, the description thereof will be omitted here.

Also, in the embodiment, the visibility of the first display object and the second display object according to the embodiment described above may be different, for example, by causing the first display object and the second display object to be displayed with different sizes. For example, the first display object may be displayed with a first size (for example, a display size specified from the position of the content, the position of the viewpoint, or the like) and the second display object may be displayed with a second size less than the first size. Also, an object obtained by partially omitting the first display object may be the second display object. For example, the visibility of the first display object and the second display object may be different by causing an icon and a descriptive sentence to be contained in the first display object and causing only an icon to be contained in the second display object.

For example, the display control unit 130 according to the embodiment may perform display control such that a display object with high transmittance is displayed as the position of the content and the position of the viewpoint are closer to each other.

Figure 11:
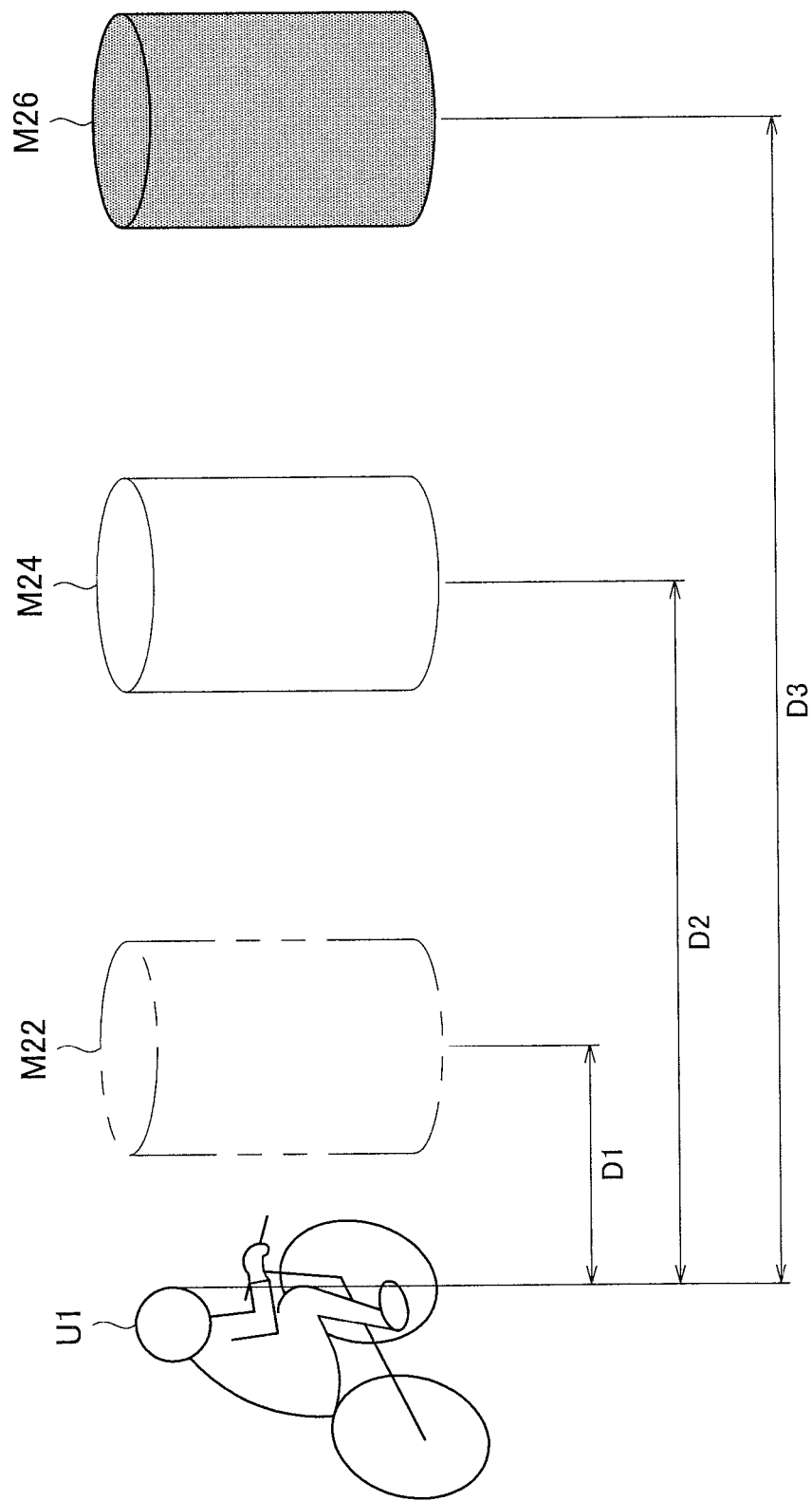
FIG. 11 is an explanatory diagram schematically illustrating an overview of display control by the display control unit according to a second embodiment of the present disclosure.

FIG. 11 is an explanatory diagram schematically illustrating an overview of display control by the display control unit 130 according to the second embodiment. For example, as illustrated in FIG. 11, in a case in which a distance between a user U1 and content is a distance D3, the display control unit 130 may specify a non-transparent normal object M26 and may cause the display unit 180 to display the normal object M26. Also, as illustrated in FIG. 11, in a case in which the distance between the user U1 and the content is a distance D2 shorter than the distance D3, the display control unit 130 may specify a low semitransparent special object M24 with low visibility and may cause the display unit 180 to display the special object M24. Also, as illustrated in FIG. 11, in a case in which the distance between the user U1 and the content is a distance D1 further shorter than the distance D2, the display control unit 130 may specify a full-transparent special object M24 with lower visibility and may cause the display unit 180 to display the special object M24 (may cause the display unit 180 not to display the special object). That is, in a non-contact state of the display objects corresponding to the user U1 and the content, the visibility of the display object corresponding to the content may be lowered as the distance between the user U1 and the content is closer.

Note that the display control unit 130 according to the embodiment may specify the display object as described above on the basis of determination by the determination unit 160 to be described below. For example, in a case in which the determination unit 160 to be described below determines that an object with low visibility should be displayed, the display control unit 130 specifies a special object (an object with low visibility) as a display object corresponding to content and causes the display unit 180 to display the special object.

Also, the display control unit 130 according to the embodiment may specify the display object corresponding to the content on the basis of a comparison result of the distance with the predetermined threshold performed by the determination unit 160. For example, in a case in which the distance is greater than the threshold, a normal object may be specified as the display object corresponding to the content. In a case in the display size is equal to or less than the threshold, a special object may be specified as the display object corresponding to the content.

(Threshold Setting Unit)

The threshold setting unit 150 according to the embodiment sets a predetermined threshold for determination by the determination unit 160 to be described below. For example, the predetermined threshold set by the threshold setting unit 150 is compared to the distance between the position of content and the position of the viewpoint by the determination unit 160 to be described below. Also, as described above, the display control unit 130 specifies a display object corresponding to content on the basis of the comparison result. Accordingly, the display object corresponding to the content is specified by comparing the predetermined threshold to the distance.

The predetermined threshold may be set based on at least one of, for example, user information regarding the user, content information regarding the content, environment information indicating an environment surrounding the user, and device information regarding a device that displays the display object. Since the user information, the content information, the environment information, and the device information have been described in the first embodiment, the description thereof will be omitted here. Hereinafter, several examples of setting of the threshold by the threshold setting unit 150 on the basis of the user information, the content information, the environment information, and the device information will be described.

Figure 12:
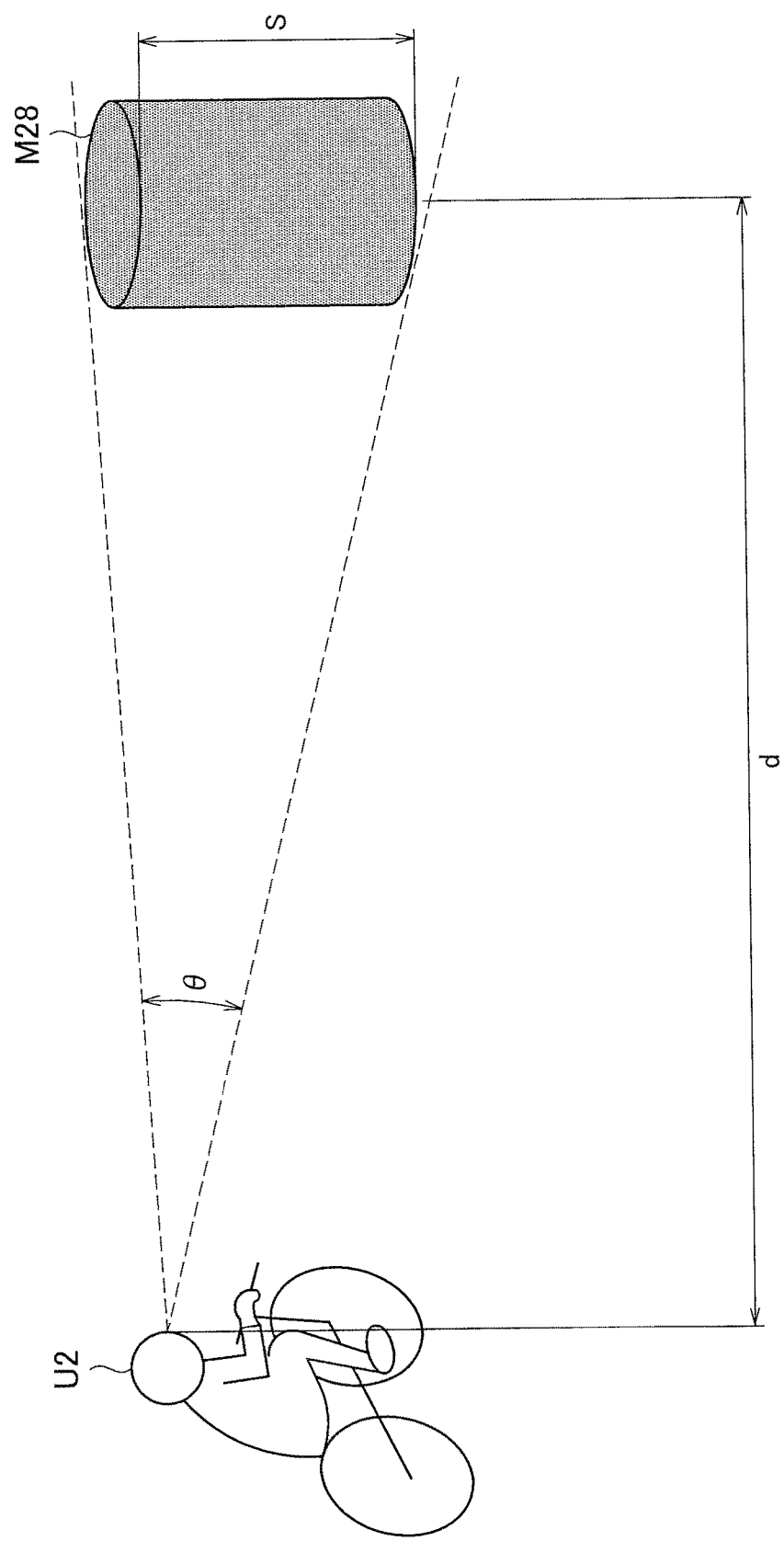
FIG. 12 is an explanatory diagram schematically illustrating a threshold setting example based on a content size by the display control unit according to the embodiment.

For example, when a content size is large, the angle of view of the user is hindered with ease despite a large distance. Therefore, the threshold setting unit 150 may set the threshold so that the threshold is larger as the content size included in the content information is large. FIG. 12 is an explanatory diagram schematically illustrating a threshold setting example based on a content size. For example, when S is the content size (a height or a width) and θ is a display field angle (a height direction or a width direction) of a display device (the display unit 180), a distance d in which a display object with the content size is within the field angle is obtained as in the following expression.

[Math. 3]

$$d = \frac{S}{2\tan\frac{\theta}{2}} \quad (3)$$

As illustrated in FIG. 12, when a distance between a user U2 and content is equal to or greater than d obtained in Expression (3), a display object M28 with a content size S can be entirely displayed within the display field angle of the display unit 180. Accordingly, for example, the distance d may be set as the threshold or a value obtained by adding a predetermined value to the distance d or a value obtained by multiplying the distance d by a predetermined value may be set as the threshold. Note that a threshold setting method based on the content size is not limited to the foregoing examples. For example, the threshold setting unit 150 may calculate a distance in which the display object occupies a predetermined ratio on the display unit 180 on the basis of the content size and may set the distance as the threshold.

Also, the threshold setting unit 150 may set the threshold so that the threshold is different between cases in which the position of the content and the position of the viewpoint are close and distant on the basis of motion information included in the user information. For example, the threshold may be set so that the threshold decreases in a case in which the user is closer to the content, and the threshold increases in a case in which the user is more away from the content. In this configuration, in a case in which the distance between the position of the content and the position of the viewpoint is changed frequently, it is possible to prevent the display object from being frequently switched (seen to flicker).

The threshold setting examples by the threshold setting unit 150 according to the embodiment has been described, but the threshold setting method by the threshold setting unit 150 is not limited to the foregoing examples. The threshold setting unit 150 may set the threshold so that the threshold increases in a case in which the content hinders the user with ease, without being limited to the foregoing method. That is, the threshold setting unit 150 according to the embodiment can set the threshold in accordance with a method similar to the threshold setting example described in the first embodiment. For example, the threshold setting unit 150 according to the embodiment may set the threshold so that the threshold of the distance according to the embodiment increases in a case in which a case similar to the threshold setting example in which the threshold of the display size decreases according to the first embodiment. In this configuration, it is easy to display a display object (special object) which has low visibility and is unlikely to hinder the user in a situation in which the content hinders the user with ease.

Note that the threshold setting unit 150 according to the embodiment may set a plurality of thresholds. In this case, display objects of which visibility is different in a plurality of stages may be prepared in accordance with the number of thresholds (the display objects may be stored in the storage unit 170 or may be generated by the display control unit 130). For example, in a case in which two thresholds are set, as described with reference to FIG. 11, three display objects (a normal object and two special objects) are prepared. Thus, finer display control can be performed in accordance with a distance.

(Determination Unit)

The determination unit 160 according to the embodiment compares a predetermined threshold set by the threshold setting unit 150 to a distance between the position of the content and the position of the viewpoint and supplies a comparison result to the display control unit 130.

Also, the determination unit 160 may determine whether a display object with low visibility is displayed (specified) (display is switched forcibly irrespective of a distance) on the basis of the user information, the content information, the environment information, the device information, or the like described above. The determination (hereinafter referred to as forcible switching determination in some cases) by the determination unit 160 according to the embodiment may be performed similarly to the example of the forcible switching determination described in the first embodiment.

(Storage Unit)

The storage unit 170 according to the embodiment stores information regarding content and information regarding a display object similarly to the storage unit 170 according to the first embodiment. The storage unit 170 may store a display object with high visibility (a normal object) and a display object with low visibility (a special object) as display objects corresponding to one piece of content and may supply the display objects to the display control unit 130. For example, the storage unit 170 according to the embodiment may store a display object including an icon and a descriptive sentence as a normal object corresponding to certain content and may store a display object including only an icon as a special object.

Also, the storage unit 170 may store only a normal object as a display object corresponding to one piece of content and the display control unit 130 may perform a specific process on the normal object supplied from the storage unit 170 to acquire (generate) a special object.

Content related to the content information stored in the storage unit 170 are similar to the examples of the content described with reference to FIGS. 4A, 4B, 5, 6A, 6B, 7, and 8 in the first embodiment and may include, for example, text data, an image, a 3D model, an effect, a marking, a silhouette, and the like.

2-3. Operation of Second Embodiment

The example of the configuration of the information processing device 1 according to the second embodiment of the present disclosure has been described above. Next, examples of two operations of the information processing device 1 according to the embodiment will be described with reference to FIGS. 13 and 14 particularly focusing on operations related to display control and specifying of a display object by the display control unit 130, the threshold setting unit 150, and the determination unit 160.

Operation Example 1

Figure 13:
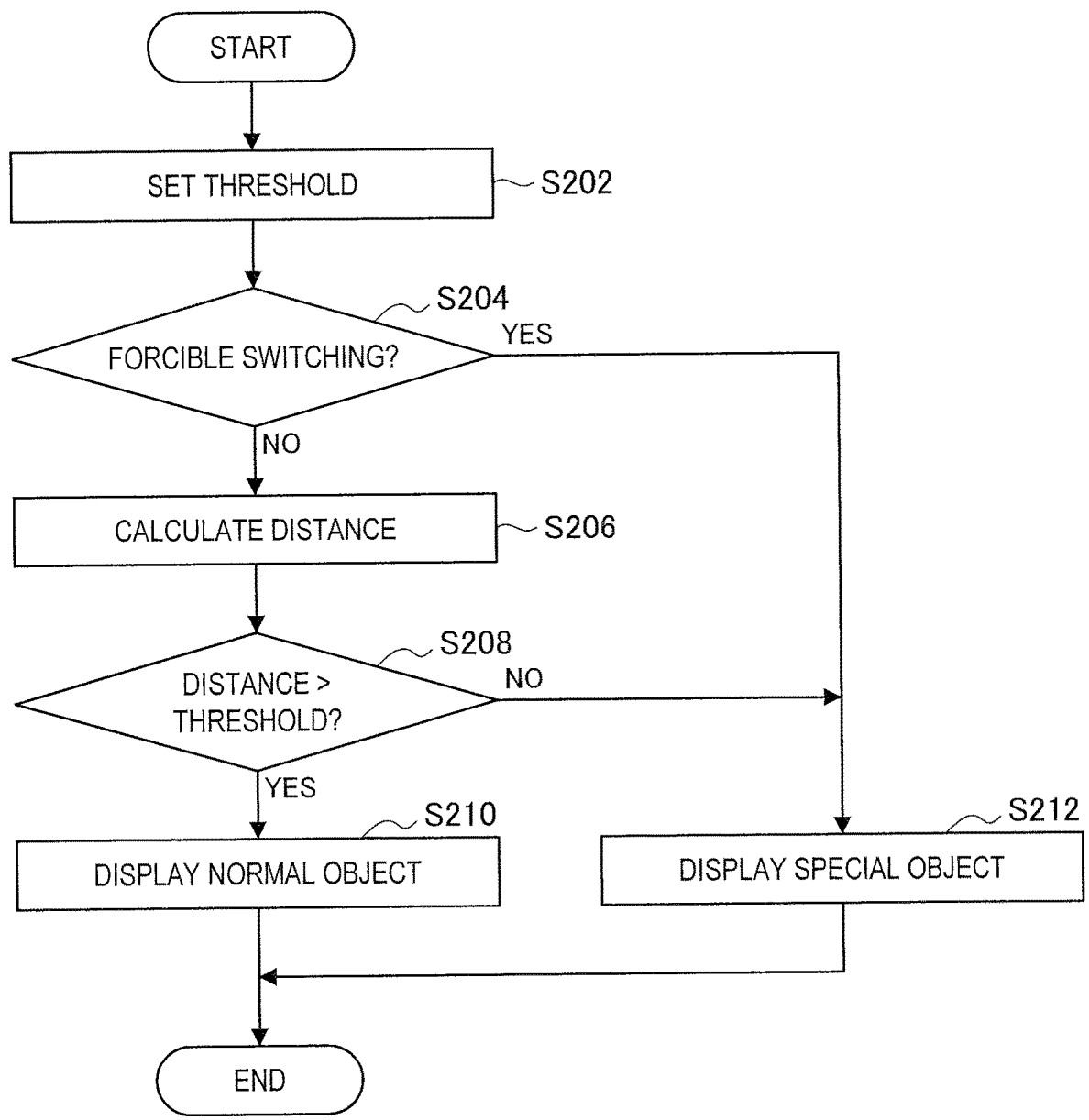
FIG. 13 is a flowchart for describing an operation example of an information processing device according to the embodiment.

FIG. 13 is a flowchart for describing an example of an operation (operation example 1) of the information processing device 1 according to the embodiment. First, the threshold setting unit 150 sets a threshold on the basis of user information, content information, environment information, device information, or the like (S202). Subsequently, the determination unit 160 determines whether a display object with low visibility should be displayed, irrespective of a distance (forcible switching determination) (S204).

In a case in which it is determined that the display object with low visibility should be displayed in the forcible switching determination (YES in S204), the display control unit 130 specifies a special object as a display object to be displayed and causes the display unit 180 to display the special object (S212).

Conversely, in a case in which it is not determined that the display object with low visibility should be displayed in the forcible switching determination (NO in S204), the display control unit 130 calculates a distance between the position of the content and the position of the viewpoint of content (S206).

Subsequently, the determination unit 160 compares the threshold set by the threshold setting unit 150 to the distance (S208). In a case in which the distance is greater than the threshold (YES in S208), the display control unit 130 specifies a normal object as a display object to be displayed and causes the display unit 180 to display the normal object (S210). Conversely, in a case in which the distance is less than or equal to the threshold (NO in S208), the display control unit 130 specifies the special object as the display object to be displayed and causes the display unit 180 to display the special object (S212).

Note that to display the display object in accordance with the positional relation between the position of the content and the position of the viewpoint in the current state, the above-described series of processes may be repeatedly performed periodically or as soon as the series of processes ends.

Operation Example 1

Figure 14:
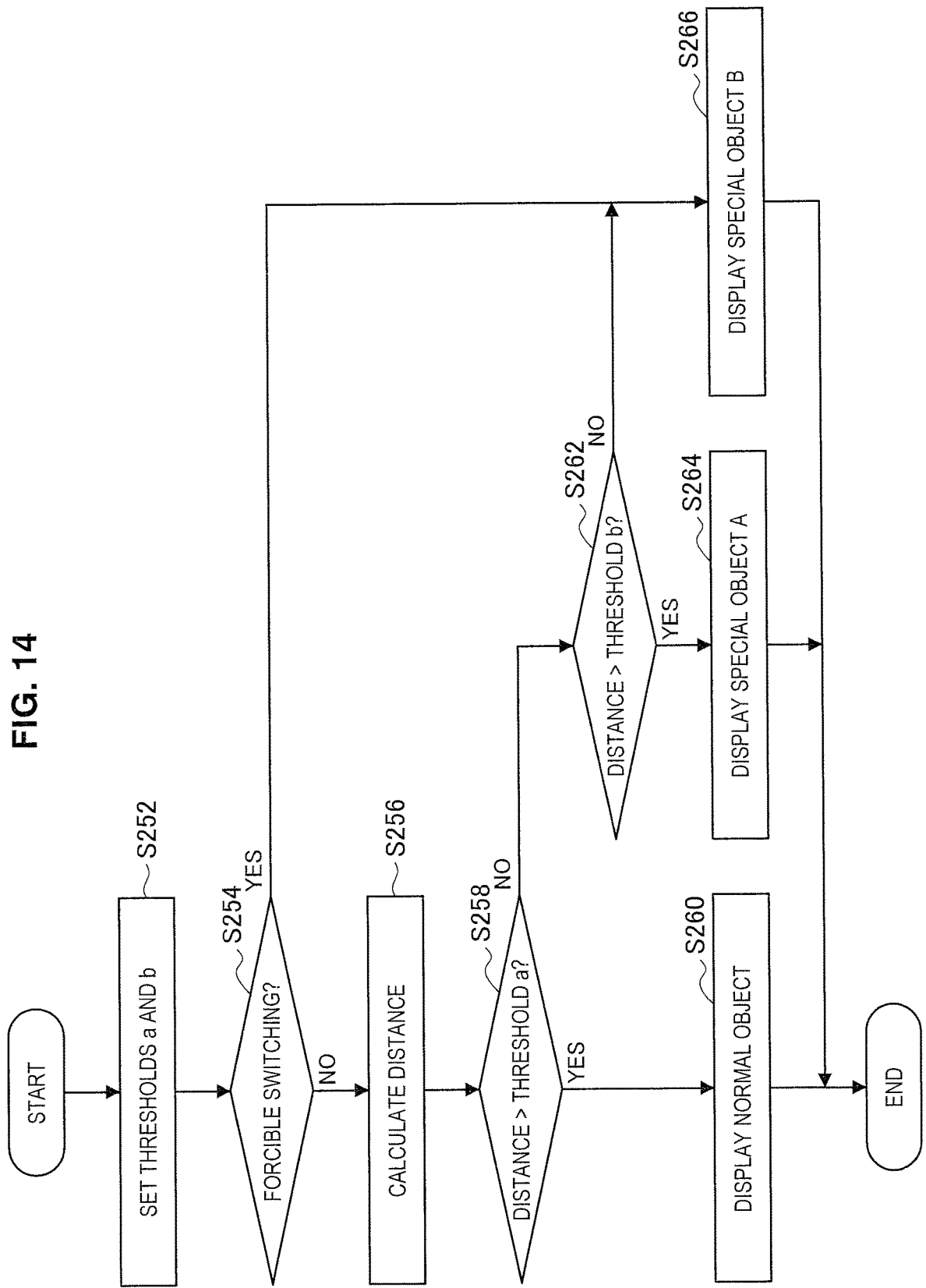
FIG. 14 is a flowchart for describing another example operation of the information processing device according to the embodiment.

The example in which one predetermined threshold is set has been described in Operation Example 1 described with reference to FIG. 13. Hereinafter, an example of an operation in a case in which a plurality of predetermined thresholds are set will be described as Operation Example 2. As described above, in a case in which a plurality of thresholds are set, display objects of which visibility is different in a plurality of stages are prepared in accordance with the number of thresholds. In this example of the operation, an example in which two thresholds (a threshold a and a threshold b) are set display control is performed using three display objects with different visibility (a normal object, a special object A, and a special object B) will be described. Note that the threshold a is greater than the threshold b and the special object A is a display object that has lower visibility than the normal object and higher visibility than the special object B. For example, the normal object may be a non-transparent display object, the special object A may be a semitransparent display object, and the special object B may be a display object with higher transmittance than the transmittance of the special object A. FIG. 14 is a flowchart for describing another operation example (Operation Example 2) of the information processing device 1 according to the embodiment.

First, the threshold setting unit 150 sets two thresholds (threshold a and threshold b) on the basis of user information, content information, environment information, device information, or the like (S252). Subsequently, the determination unit 160 determines whether a display object with low visibility should be displayed, irrespective of a distance (forcible switching determination) (S254).

In a case in which it is determined that the display object with low visibility should be displayed in the forcible switching determination (YES in S254), the display control unit 130 specifies a special object B as a display object to be displayed and causes the display unit 180 to display the special object B (S266).

Conversely, in a case in which it is not determined that the display object with low visibility should be displayed in the forcible switching determination (NO in S254), the display control unit 130 calculates a distance between the position of the content and the position of the viewpoint of content (S256).

Subsequently, the determination unit 160 compares the threshold a set by the threshold setting unit 150 to the distance (S258). In a case in which the distance is greater than the threshold a (YES in S258), the display control unit 130 specifies a normal object as a display object to be displayed and causes the display unit 180 to display the normal object (S260). Conversely, in a case in which the distance is less than or equal to the threshold a (NO in S258), the determination unit 160 compares the threshold b set by the threshold setting unit 150 to the distance (S262). In a case in which the distance is greater than the threshold b (YES in S262), the display control unit 130 specifies a special object A as a display object to be displayed and causes the display unit 180 to display the special object A (S264). Conversely, in a case in which the distance is less than or equal to the threshold b (NO in S262), the display control unit 130 specifies the special object B as the display object to be displayed and causes the display unit 180 to display the special object B (S266).

Note that to display the display object in accordance with the positional relation between the position of the content and the position of the viewpoint in the current state, the above-described series of processes may be repeatedly performed periodically or as soon as the series of processes ends.

2-4. Advantageous Effects of Second Embodiment

The first embodiment of the present disclosure has been described above. According to the embodiment, by specifying a display object on the basis of the positional relation between the position of content and the position of viewpoint, it is possible to prevent occurrence of a situation in which the user is unlikely to view a background.

3. Hardware Configuration Example

Each embodiment of the present disclosure has been described above. Information processing such as the display control process, the threshold setting process, and the determination process described above is realized in cooperation of software and hardware of the information processing device 1 to be described below.

Figure 15:
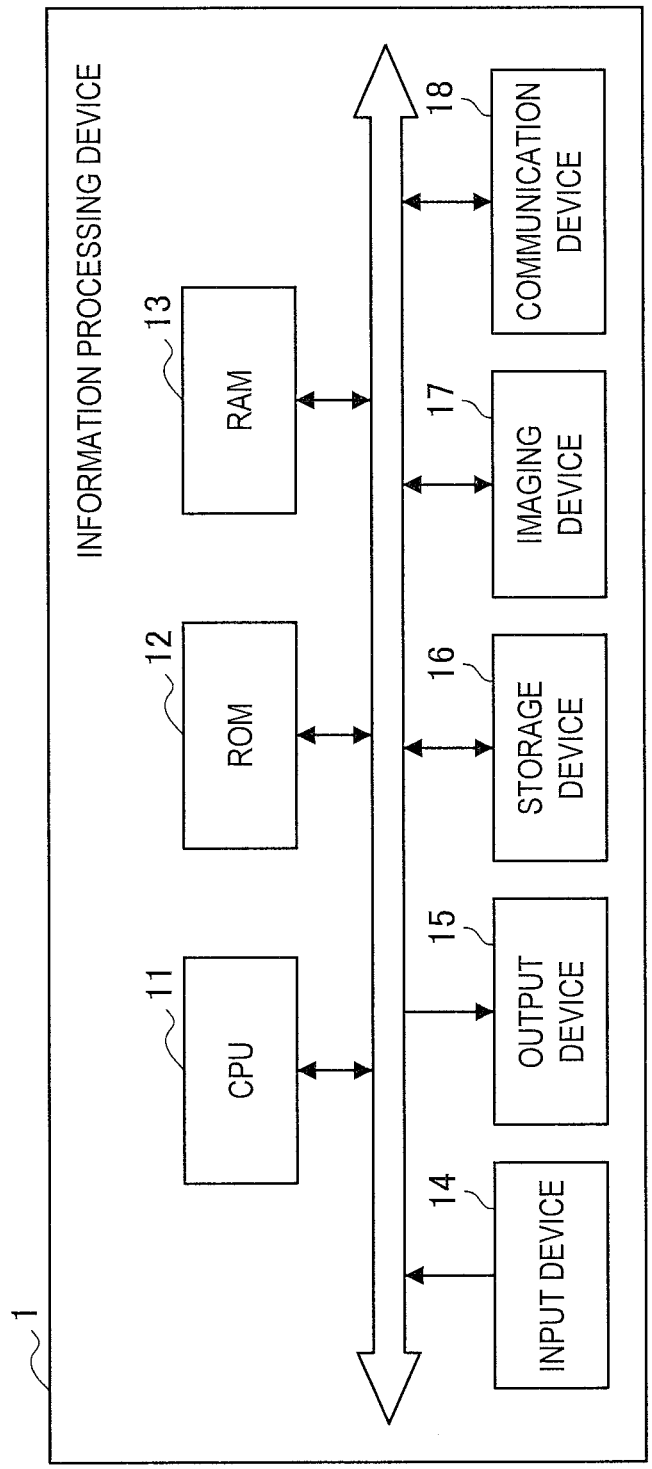
FIG. 15 is an explanatory diagram illustrating an example of a hardware configuration of an information processing device according to the present disclosure.

FIG. 15 is an explanatory diagram illustrating an example of a hardware configuration of the information processing device 1. As shown in FIG. 15, the information processing device 1 includes a central processing unit (CPU) 11, a read only memory (ROM) 12, a random access memory (RAM) 13, an input device 14, an output device 15, a storage device 16, an imaging device 17, and a communication device 18.

The CPU 11 functions as an operation processing device and a control device, and controls the overall operation in the information processing device 1 in accordance with various programs. The CPU 11 may also be a microprocessor. The ROM 12 stores programs, operation parameters and the like used by the CPU 11. The RAM 13 temporarily stores programs used in the execution of the CPU 11, parameters that change appropriately in that execution, and the like. These are connected together by a host bus including a CPU bus or the like. The functions of the image recognition unit 120, the display control unit 130, the threshold setting unit 150, and the determination unit 160 are realized mainly through software working in cooperation with the CPU 11, the ROM 12, and the RAM 13.

The input device 14 includes inputting means such as a mouse, a keyboard, a touch panel, a button, a microphone, a switch, and a lever, for the user to input information, an input control circuit that generates an input signal on the basis of input by the user, and outputs the generated input signal to the CPU 11, and the like. The user of the information processing device 1 is able to input various kinds of data and direct processing operations with respect to the information processing device 1, by operating the input device 14.

The output device 15 includes a display device such as a liquid crystal display (LCD) device, an OLED device, and a lamp, for example. Furthermore, the output device 15 includes a voice output device such as a speaker and headphones. For example, the display device displays a captured image, a generated image or the like. On the other hand, the voice output device converts voice data and the like into voice, and then outputs the voice. The output device 15 corresponds to the display unit 180 described with reference to FIG. 2.

The storage device 16 is a device for storing data. The storage device 16 may include a storage medium, a recording device that records data in a storage medium, a readout device that reads out data from a storage medium, a deletion device that deletes data recorded in a storage medium, and the like. The storage device 16 stores programs executed by the CPU 11 and various kinds of data. The storage device 16 corresponds to the storage unit 170 described with reference to FIG. 2.

The imaging device 17 includes an imaging optical system such as a shooting lens which collects light and a zoom lens, and a signal conversion device such as a charge coupled device (CCD) and a complementary metal oxide semiconductor (CMOS). The imaging optical system collects light emitted from a subject to form a subject image at a signal converting unit, and the signal conversion device converts the formed subject image into an electrical image signal. The imaging device 17 corresponds to the imaging unit 110 described with reference to FIG. 2.

The communication device 18 is a communication interface including a communication device for connecting to the communication network, or the like, for example. Also, the communication device 18 may include a wireless local area network (LAN) compatible communication device, a long term evolution (LTE) compliant communication device, a wired communication device that performs communication via a wire, or a Bluetooth (registered trademark) communication device.

4. Conclusion

It is possible to prevent occurrence of the situation in which the user is unlikely to view a background according to each embodiment of the present disclosure, as described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the example in which the display size or the distance is compared to the threshold, the display object displayed in accordance with the comparison result is specified, and the display object is switched has been described in the foregoing embodiments, but the present technology is not limited to this example. For example, when a display object is switched, the display object before the switching and the display object after the switching may be displayed while being subjected to alpha blending. Also, the display control may be performed such that the display object before the switching is faded out, the display object before the switching is subsequently faded in. Also, the foregoing alpha blending, fading-out, and fading-in operations may be performed in response to a change in the display size or the distance or may be performed in response to a temporal change. Also, the display control unit may generate (specify) the display object by changing a parameter related to the visibility (transmittance, lightness, a color, or the like) in accordance with a change in the display size or the distance.

Also, the display control based on the display size or the distance related to one piece of content has been described in the foregoing embodiments, but the present technology is not limited to this example. For example, in a case in which there are a plurality of pieces of content, the comparison determination or the like related to the display size or the distance may be performed independently for each piece of content or the comparison determination may be performed using a sum value, a maximum value, a minimum value, an average value, or the like of a plurality of display sizes or distances.

Also, the example in which a display object is displayed on a glasses type display device including an optical see-through display unit has been described in the foregoing embodiments, but the present technology is not limited to this example. For example, the present technology may be applied to an information processing device (a video see-through type head-mounted display or the like) that causes a display unit to display an image generated by superimposing a display object on an image of a real space (background) acquired by an imaging unit. Also, the present technology may be applied to a head-up display that causes an image to be displayed on a windshield or the like of an automobile or the present technology may be applied to an installed display device. Also, the present technology may be applied to an information processing device that renders an image in which a display object is disposed in a virtual space using the visual space as a background and causes a non-transmissive display unit to display a rendered image. Note that the example in which a display object is displayed using a real space as a background has been described in the foregoing embodiments. However, in a case in which the present technology is applied to an information processing device that causes a non-transmissive display unit to display an image, the display object may be displayed using the virtual space as the background.

Also, in the foregoing embodiment, the example in which the information processing device performing the display control includes the display unit has been described, but the present technology is not limited to this example. For example, the information processing device performing the display control and a display device including the display unit may be different devices.

Also, the example in which the information processing device performing the display control includes the imaging unit, the image recognition unit, the threshold setting unit, the storage unit, and the like has been described in the foregoing embodiments, but the present technology is not limited to this example. For example, the information processing device performing the display control may perform the display control by receiving information regarding a captured image, an image recognition result, a display size, a distance between the position of the content and the position of the viewpoint, a threshold, content, a display object, and the like directly from another device or via a network or the like.

Also, the respective steps in the embodiment described above do not necessarily have to be performed chronologically in the order illustrated in the flowchart. For example, the respective steps in the process of the embodiment described above may also be performed in a different order than the order illustrated in the flowchart, or they may be performed in parallel.

Also, a computer program for causing the hardware such as the CPU, ROM, and RAM built in the information processing device 1 to demonstrate the function of the information processing device 1 described above can also be created. Also, a storage medium that has the computer program stored therein is also provided. Also, the number of computers executing the computer program is not particularly limited. For example, the computer program may be executed in cooperation by a plurality of computers (for example, a plurality of servers or the like). Note that a single computer or a plurality of computers in cooperation is referred to as a "computer system."

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a display control unit configured to perform display control such that a first virtual object corresponding to content is contained in a rendering image of the content to be displayed in a case in which a position of the content defined in a virtual space and a position of a viewpoint defined in the virtual space to generate the rendering image are determined to have a first positional relation, and a second virtual object corresponding to the content is contained in the rendering image to be displayed in a case in which the position of the content and the position of the viewpoint are determined to have a second positional relation, in which a distance between the position of the content and the position of the viewpoint in the second positional relation is shorter than a distance between the position of the content and the position of the viewpoint in the first positional relation, and visibility of the second virtual object is lower than visibility of the first virtual object.

(2)

The information processing device according to (1), in which the display control unit performs the display control by specifying a virtual object corresponding to the content on a basis of a distance between the position of the content and the position of the viewpoint.

(3)

The information processing device according to (2), in which, between the first virtual object and the second virtual object, at least one of a rendering method, a color, a texture, transmittance, and a pattern is different.

(4)

The information processing device according to (2) or (3), in which the virtual object corresponding to the content is specified further on a basis of user information.

(5)

The information processing device according to (4), in which the user information includes at least one of behavior information indicating a behavior of a user, motion information indicating a motion of the user, biological information, and gazing information.

(6)

The information processing device according to any one of (2) to (5), in which the virtual object corresponding to the content is specified further on a basis of content information regarding the content.

(7)

The information processing device according to (6), in which the content information includes at least one piece of information among a display position, a color, an animation characteristic, a content attribute, a content resolution, and a content size.

(8)

The information processing device according to any one of (2) to (7), in which the virtual object corresponding to the content is specified further on a basis of environment information indicating an environment surrounding a user.

(9)

The information processing device according to (8), in which the environment information includes at least one of a background, illumination, and a place.

(10)

The information processing device according to any one of (2) to (9), in which the virtual object corresponding to the content is specified further on a basis of device information regarding a device that displays the virtual object.

(11)

The information processing device according to (10), in which the device information includes at least one piece of information among a display size, a display resolution, a battery, a 3D display function, and a device position.

(12)

The information processing device according to any one of (2) to (11), in which the virtual object corresponding to the content is specified by comparing a predetermined threshold to the distance.

(13)

The information processing device according to (12), in which a plurality of the predetermined thresholds are set.

(14)

The information processing device according to (12), in which the predetermined threshold is set on a basis of at least one of user information, content information, environment information, and device information.

(15)

The information processing device according to any one of (1) to (14), in which the content includes at least one of text data, an image, a 3D model, an effect, a marking, and a silhouette.

(16)

The information processing device according to any one of (1) to (15), in which the position of the content is specified on a basis of a sensing result of a real object.

(17)

The information processing device according to (16), in which a visual line direction used for rendering of the rendering image is specified in accordance with a detection result of a position or an attitude of a display unit that displays the rendering image.

(18)

The information processing device according to (17), in which the display control unit causes a transmissive display unit to display the first virtual object or the second virtual object.

(19)

An information processing method including:

performing, by an information processing device, display control such that a first virtual object corresponding to content is contained in a rendering image of the content to be displayed in a case in which a position of the content defined in a virtual space and a position of a viewpoint defined in the virtual space to generate the rendering image are determined to have a first positional relation, and a second virtual object corresponding to the content is contained in the rendering image to be displayed in a case in which the position of the content and the position of the viewpoint are determined to have a second positional relation, in which a distance between the position of the content and the position of the viewpoint in the second positional relation is shorter than a distance between the position of the content and the position of the viewpoint in the first positional relation, and visibility of the second virtual object is lower than visibility of the first virtual object.

(20)

A program causing a computer system to realize a display control function of performing display control such that a first virtual object corresponding to content is contained in a rendering image of the content to be displayed in a case in which a position of the content defined in a virtual space and a position of a viewpoint defined in the virtual space to generate the rendering image are determined to have a first positional relation, a second virtual object corresponding to the content is contained in the rendering image to be displayed in a case in which the position of the content and the position of the viewpoint are determined to have a second positional relation, a distance between the position of the content and the position of the viewpoint in the second positional relation is shorter than a distance between the position of the content and the position of the viewpoint in the first positional relation, and visibility of the second virtual object is lower than visibility of the first virtual object.

REFERENCE SIGNS LIST

1 information processing device
110 imaging unit
120 image recognition unit
130 display control unit
140 sensor unit
150 threshold setting unit
160 determination unit
170 storage unit
180 display unit
182 spatial light modulation unit
184 collimating optical system
186 light-guiding plate

The invention claimed is:

1. An information processing device, comprising:
a display control unit configured to:
control display of a first virtual object corresponding to content based on a first positional relation between a position of the content defined in a virtual space and a position of a viewpoint defined in the virtual space, wherein the content corresponds to information of a real object in a real space;
control display of a second virtual object corresponding to the content based on a second positional relation between the position of the content and the position of the viewpoint, wherein
a first distance between the position of the content and the position of the viewpoint in the second positional relation is shorter than a second distance between the position of the content and the position of the viewpoint in the first positional relation, and
a first visibility of the second virtual object is lower than a second visibility of the first virtual object; and
generate a rendering image of the content, wherein the rendering image of the content includes one of the first virtual object or the second virtual object based on the position of the content in the virtual space.

2. The information processing device according to claim 1, wherein the display control unit is further configured to:
specify a virtual object corresponding to the content based on a third distance between the position of the content and the position of the viewpoint; and
control display of the first virtual object and the second virtual object based on the specified virtual object.

3. The information processing device according to claim 2, wherein, between the first virtual object and the second virtual object, at least one of a rendering method, a color, a texture, transmittance, or a pattern is different.

4. The information processing device according to claim 2, wherein the display control unit is further configured to specify the virtual object corresponding to the content based on user information.

5. The information processing device according to claim 4, wherein the user information includes at least one of behavior information indicating a user behavior, motion information indicating a user motion, biological information, or gazing information.

6. The information processing device according to claim 2, wherein
the display control unit is further configured to specify the virtual object corresponding to the content based on content information regarding the content.

7. The information processing device according to claim 6, wherein the content information includes at least one of a display position, a color, an animation characteristic, a content attribute, a content resolution, or a content size.

8. The information processing device according to claim 2, wherein
the display control unit is further configured to specify the virtual object corresponding to the content based on environment information indicating an environment surrounding a user.

9. The information processing device according to claim 8, wherein the environment information includes at least one of a background, illumination, or a place.

10. The information processing device according to claim 2, wherein the display control unit is further configured to specify the virtual object corresponding to the content based on device information regarding a device that displays the virtual object.

11. The information processing device according to claim 10, wherein the device information includes at least one of a display size, a display resolution, a battery, a 3D display function, or a device position.

12. The information processing device according to claim 2, further comprising
a determination unit configured to compare a threshold to the first distance and the second distance, wherein
the display control unit is further configured to specify the virtual object based on the comparison.

13. The information processing device according to claim 12, further comprising
a threshold setting unit configured to set a plurality of thresholds.

14. The information processing device according to claim 13, wherein
the threshold setting unit is further configured to set the threshold based on at least one of user information, content information, environment information, or device information.

15. The information processing device according to claim 1, wherein the content includes at least one of text data, an image, a 3D model, an effect, a marking, or a silhouette.

16. The information processing device according to claim 1, wherein the display control unit is further configured to specify the position of the content based on a sensing result of the real object.

17. The information processing device according to claim 16, further comprising:
a display unit configured to display the rendering image; and
a sensor unit configured to detect at least one of a position of the display unit or an attitude of the display unit, wherein
a visual line direction used to render the rendering image is specified based on the detected position or the detected attitude of the display unit.

18. The information processing device according to claim 17, wherein the display control unit is further configured to control a transmissive display unit to display one of the first virtual object or the second virtual object.

19. An information processing method, comprising:
controlling display of a first virtual object corresponding to content based on a first positional relation between a position of the content defined in a virtual space and a position of a viewpoint defined in the virtual space, wherein the content corresponds to information of a real object in a real space;
control display of a second virtual object corresponding to the content based on a second positional relation between the position of the content and the position of the viewpoint, wherein
a first distance between the position of the content and the position of the viewpoint in the second positional relation is shorter than a second distance between the position of the content and the position of the viewpoint in the first positional relation, and
a first visibility of the second virtual object is lower than a second visibility of the first virtual object; and
generating a rendering image of the content, wherein
the rendering image of the content includes one of the first virtual object or the second virtual object based on the position of the content in the virtual space.

20. A non-transitory computer-readable medium having stored thereon, computer-executable instructions which, when executed by a computer system, cause the computer system to execute operations, the operations comprising:
controlling display of a first virtual object corresponding to content based on a first positional relation between a position of the content defined in a virtual space and a position of a viewpoint defined in the virtual space, wherein the content corresponds to information of a real object in a real space;
control display of a second virtual object corresponding to the content based on a second positional relation between the position of the content and the position of the viewpoint, wherein
a first distance between the position of the content and the position of the viewpoint in the second positional relation is shorter than a second distance between the position of the content and the position of the viewpoint in the first positional relation, and
a first visibility of the second virtual object is lower than a second visibility of the first virtual object; and
generating a rendering image of the content, wherein
the rendering image of the content includes one of the first virtual object or the second virtual object based on the position of the content in the virtual space.

* * * * *